United States Patent [19]

Akamatsu et al.

[11] Patent Number: 5,295,805
[45] Date of Patent: Mar. 22, 1994

[54] ROTATING CYLINDRICAL TREATMENT APPARATUS

[75] Inventors: Hirokazu Akamatsu, Yokkaichi; Toyokazu Uda, Kita-Kyushu; Masahiro Nishida, Yokkaichi, all of Japan

[73] Assignee: Ryoka Techno Engineering & Construction Co., Tokyo, Japan

[21] Appl. No.: 84,441

[22] Filed: Jul. 1, 1993

Related U.S. Application Data

[63] Continuation of Ser. No. 885,018, May 19, 1992, abandoned, which is a continuation of Ser. No. 604,247, Oct. 29, 1990, abandoned.

[30] Foreign Application Priority Data

| Mar. 2, 1990 | [JP] | Japan | 2-49442 |
| Mar. 2, 1990 | [JP] | Japan | 2-49443 |
| Mar. 2, 1990 | [JP] | Japan | 2-49444 |
| Mar. 2, 1990 | [JP] | Japan | 2-49445 |
| Mar. 7, 1990 | [JP] | Japan | 2-53725 |
| Mar. 22, 1990 | [JP] | Japan | 2-69682 |
| May 8, 1990 | [JP] | Japan | 2-116822 |

[51] Int. Cl.$^5$ .................. B29C 35/16; B29C 43/52
[52] U.S. Cl. .................. 425/373; 165/89; 165/90; 198/844.2; 264/175; 425/363
[58] Field of Search .......... 165/89, 90; 198/844.1, 198/844.2; 264/175, 212; 425/223, 224, 335, 363, 373, 436 R, 436 RM; 432/59, 60

[56] References Cited

U.S. PATENT DOCUMENTS

| 1,880,110 | 9/1932 | Shapiro | 264/146 |
| 2,572,677 | 10/1951 | Tench | 425/461 |
| 2,603,457 | 7/1952 | Bishop | 165/89 |
| 2,772,075 | 11/1956 | Mayer | 165/89 |
| 3,089,191 | 5/1963 | Conrad | 425/383 |
| 3,175,026 | 3/1965 | James | 264/210.1 |
| 3,177,558 | 4/1965 | Gronholz et al. | 29/121.8 |
| 3,325,910 | 6/1967 | Toivonen | 165/89 |
| 3,388,430 | 6/1968 | Ferrand | 425/223 |

(List continued on next page.)

FOREIGN PATENT DOCUMENTS

164912 12/1985 European Pat. Off. .

(List continued on next page.)

OTHER PUBLICATIONS

Journal of Chemical Technology, MOL, No. 12, 1988, pp. 1-4, Shoji Kawazoko, et al., "A Drum Cooler for Cooling, Hardening and Flaking Molten Resins".

(List continued on next page.)

Primary Examiner—Jay H. Woo
Assistant Examiner—James P. Mackey
Attorney, Agent, or Firm—Oblon, Spivak, McClelland, Maier & Neustadt

[57] ABSTRACT

A rotating cylindrical treatment apparatus includes a cylindrical body rotatably supported in the treatment apparatus; a feeding section for supplying a treated material onto an outer circumferential surface of the cylindrical body; a pressure roller for pressing the supplied treated material and for rolling the pressed treated material; a first medium introducing device for introducing a heating or cooling medium into the cylindrical body and for discharging the introduced medium; a second medium introducing device for introducing the medium into the pressure roller and for discharging the introduced medium; and an endless belt for conveying the rolled treated material while causing the rolled treated material to be closely contacted with the outer circumferential surface. The second medium introducing device has an introducing pipe with a spraying nozzle pipe attached thereto, the nozzle pipe projecting into the interior of the pressure roller body and including a spraying port in the projecting end face formed to spray the medium at an obtuse angle around the pressure roller body central axis, and a discharging pipe including a suction port immersed in the medium at the pressure roller body lower portion.

13 Claims, 17 Drawing Sheets

U.S. PATENT DOCUMENTS

| | | | |
|---|---|---|---|
| 3,426,839 | 2/1969 | Overton | 165/89 |
| 3,470,286 | 9/1969 | Weber | 264/167 |
| 3,546,054 | 12/1970 | Ross | 198/844.2 |
| 3,552,484 | 1/1971 | Kral et al. | 165/89 |
| 3,752,227 | 8/1973 | Bulson | 165/89 |
| 3,808,700 | 5/1974 | Kraus | 165/89 |
| 3,838,734 | 10/1974 | Kilmartin | 165/90 |
| 3,930,441 | 1/1976 | Ohkawa | 425/223 |
| 3,938,927 | 2/1976 | Brinkmann et al. | 425/224 |
| 4,012,188 | 3/1977 | Lemelson | 425/224 |
| 4,034,617 | 7/1977 | Guyer | 198/844.2 |
| 4,193,959 | 3/1980 | Lemelson | 264/166 |
| 4,631,016 | 12/1986 | Hay | 425/224 |
| 4,734,229 | 3/1988 | Johnson et al. | 425/363 |
| 4,744,854 | 5/1988 | Schenz | 425/373 |
| 4,776,383 | 10/1988 | Heinemann et al. | 425/224 |
| 4,859,392 | 8/1989 | Vetter | 425/224 |
| 4,934,928 | 6/1990 | Akamatsu | 425/373 |
| 4,946,635 | 8/1990 | Steininger | 425/373 |
| 4,999,152 | 3/1991 | Baldwin et al. | 425/363 |

FOREIGN PATENT DOCUMENTS

| | | | |
|---|---|---|---|
| 2002924 | 8/1971 | Fed. Rep. of Germany | |
| 1778618 | 11/1971 | Fed. Rep. of Germany | |
| 2129157 | 12/1971 | Fed. Rep. of Germany | |
| 2437241 | 2/1976 | Fed. Rep. of Germany | |
| 2163759 | 7/1973 | France | |
| 44-24841 | 10/1969 | Japan | |
| 56-62122 | 5/1981 | Japan | |
| 58-39415 | 3/1983 | Japan | |
| 60-125637 | 7/1985 | Japan | |
| 62-225882 | 10/1987 | Japan | |
| 62-270314 | 11/1987 | Japan | |
| 63-60726 | 3/1988 | Japan | |
| 63-222833 | 9/1988 | Japan | |
| 64-42211 | 2/1989 | Japan | |
| 64-42212 | 2/1989 | Japan | |
| 64-64909 | 3/1989 | Japan | 198/844.2 |
| 1-204716 | 8/1989 | Japan | |
| 1-231951 | 9/1989 | Japan | |
| 1-237105 | 9/1989 | Japan | |
| 4064 | of 1913 | United Kingdom | |
| 1067585 | 5/1967 | United Kingdom | |
| 1102184 | 2/1968 | United Kingdom | |
| 1417970 | 12/1975 | United Kingdom | |
| 2200588 | 8/1988 | United Kingdom | |

OTHER PUBLICATIONS

The Industrial Machinery, No. 5, 1991, pp. 1–2, Koichi Akamatsu, "A Drum Cooler".

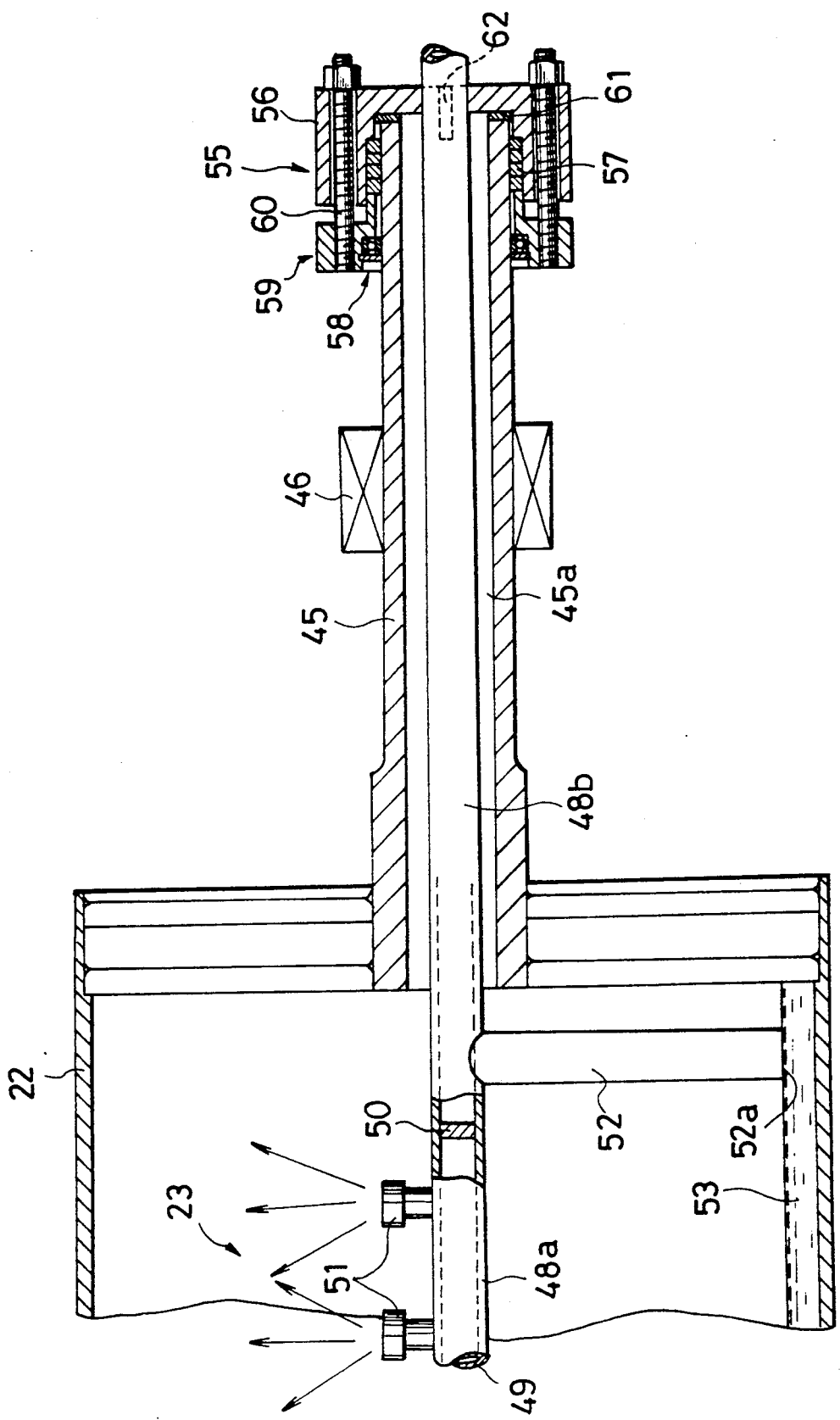

Fig. 26
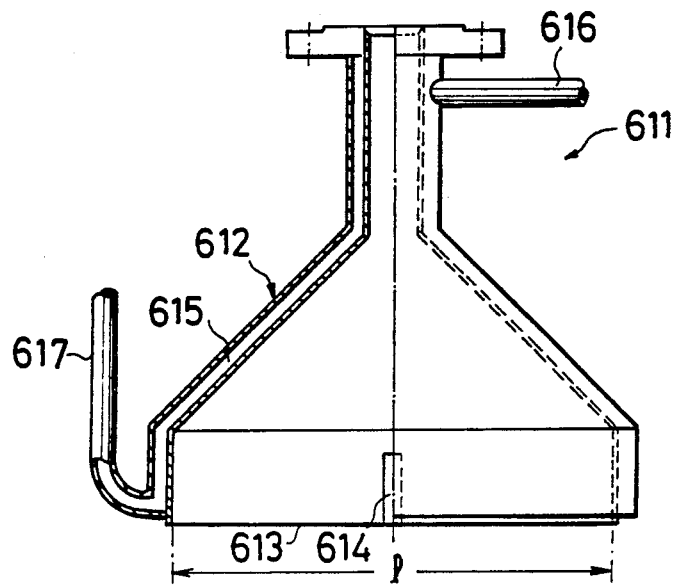
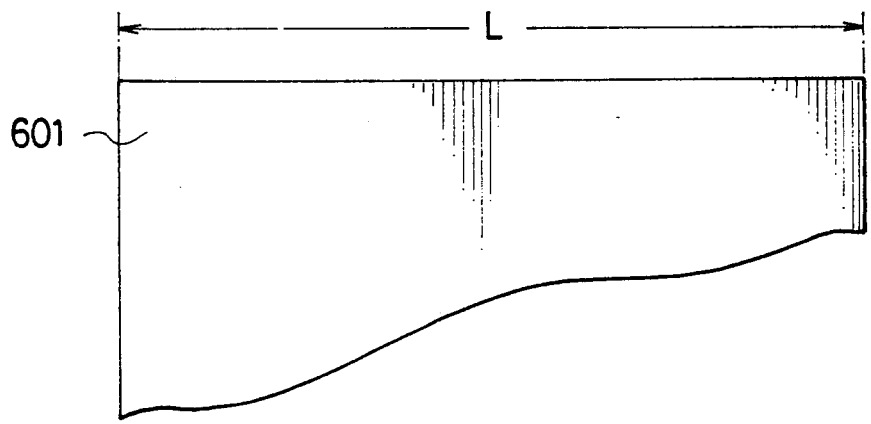
Fig. 27
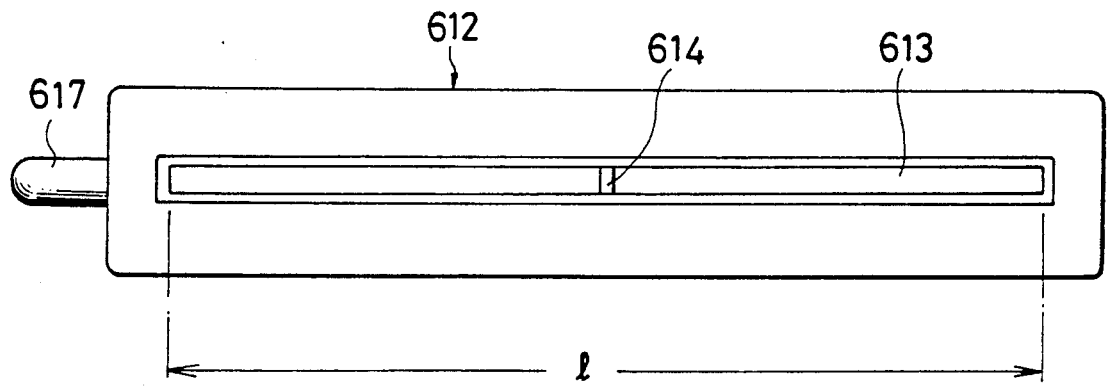

ROTATING CYLINDRICAL TREATMENT APPARATUS

This application is a continuation of application Ser. No. 07/885,018, filed on May 19, 1992, now abandoned, which is a continuation of application Ser. No. 07/604,247, filed Oct. 29, 1990, now abandoned.

BACKGROUND OF THE INVENTION

1. Field of the Invention

The present invention relates to a rotating cylindrical treatment apparatus. More particularly, the present invention relates to an apparatus for supplying synthetic resin, smashed fish or meat, etc. to be heated or cooled in the shape of a sheet-like material, etc. and pressing such a material against a heated or cooled surface of a rotating cylindrical body to heat or cool the sheet-like material.

2. Description of the Related Art

In general, a rotating cylindrical treatment apparatus of this type is used as a cooler constructing a portion of a pulverizer in manufacturing processes of thermoplastic synthetic resin, thermosetting synthetic resin, etc.

Such a rotating cylindrical treatment apparatus is disclosed in e.g., Japanese Patent Application Laying Open (KOKAI) No. 62-225882.

The rotating cylindrical treatment apparatus is mainly constructed by a cylindrical body, a heating or cooling mechanism, a feeding section for supplying a treated material, a pressure roller and an endless belt. The cylindrical body has a rotary shaft supported in a horizontal direction. The heating or cooling mechanism is disposed within the cylindrical body. The treated material feeding section is disposed above the cylindrical body. The pressure roller presses and rolls the treated material supplied onto the cylindrical body. The endless belt conveys the treated material while pressing the treated material against the cylindrical body.

In the above pressure roller, a space portion is formed at any time in a roller body since gas is left in an upper portion of the roller body. A flow of a heating or cooling medium from an introducing pipe to a discharging pipe within the roller body is a laminar flow and has a low speed. Therefore, the coefficient of heat transfer of this flow is low so that it is impossible to efficiently heat or cool the treated material.

Further, in the heating or cooling mechanism within the cylindrical body, both a feed pipe and a discharging pipe are supported in the shape of a cantilever. Accordingly, the feed pipe and the discharging pipe are vibrated by reaction force caused by the injection of pressurized air and the heating or cooling medium which are mixed with each other, vibration of the cylindrical body caused by the rotation thereof, and so forth. Therefore, there is a fear that the feed pipe and the discharging pipe are deformed or damaged since resonance is caused by the vibrations of the feed pipe and the discharging pipe. Further, it is difficult to uniformly wet an inner wall of the cylindrical body with the medium.

SUMMARY OF THE INVENTION

It is therefore an object of the present invention to provide a rotating cylindrical treatment apparatus in which a pressure roller and a cylindrical body can be efficiently heated or cooled and no damage and deformation of a heating or cooling mechanism are caused.

The above objects of the present invention can be achieved by a rotating cylindrical treatment apparatus, comprising:

a cylindrical body rotatably supported in the treatment apparatus; a feeding section arranged adjacently to the cylindrical body for supplying a treated material onto an outer circumferential surface of the cylindrical body; a pressure roller arranged adjacently to the cylindrical body and the feeding section for pressing the supplied treated material against the circumferential surface and for rolling the pressed treated material; a first medium introducing device disposed in the cylindrical body for introducing a heating or cooling medium into the cylindrical body and for discharging the introduced medium from the cylindrical body; a second medium introducing device disposed in the pressure roller for introducing the medium into the pressure roller and for discharging the introduced medium from the pressure roller; and an endless belt partially wound along the outer circumferential surface of the cylindrical body for conveying the rolled treated material while causing the rolled treated material to be closely contacted with the outer circumferential surface, the first medium introducing device comprising: a pipe body penetrating through both end faces of the cylindrical body coaxially with the cylindrical body, and having at one end thereof an inlet port of the medium and having at the other end thereof an outlet port; a partitioning member disposed in the pipe body situated in the cylindrical body in such a manner as to divide the situated pipe body into an introducing pipe section and a discharging pipe section; a spraying means disposed at the introducing pipe section for spraying the medium introduced from the inlet port into an interior of the cylindrical body; and a suction pipe disposed at the discharging pipe section for discharging the sprayed medium to an outside of the cylindrical body.

In the rotating cylindrical treatment apparatus in the present invention, the treated material is supplied onto a circumferential surface of the cylindrical body from the feeding section and is rolled by the pressure roller. Simultaneously, the treated material comes in close contact with the circumferential face of the cylindrical body by the endless belt in a predetermined rotary range, thereby sufficiently heating or cooling the treated material. In this case, the heating or cooling medium is sprayed from the medium spraying means through the introducing side pipe section of a pipe body. The medium stored within the lower portion of at least one of the cylindrical body and the pressure roller is discharged from a suction port of a discharging pipe to the exterior thereof by a siphon effect caused by the pressure of pressurized air within at least one of the pressure roller and the cylindrical body. An intermediate portion of the internal passage of the pipe body is closed by a plug so that the pipe body is substantially divided into the introducing side pipe section and the discharging side pipe section. The pipe body extends through at least one of the pressure roller and the cylindrical body along rotational central axes thereof. The pipe body is supported by a suitable support means at both ends thereof.

As mentioned above, the rotating cylindrical treatment apparatus of the present invention is constructed by a single pipe body for supplying a medium for heating or cooling at least one of the pressure roller and the cylindrical body to the interior thereof. Discharging portions of the single pipe body extend through at least one of the pressure roller and the cylindrical body. Accordingly, it is possible to prevent the treatment apparatus from being vibrated by vibrating caused by the rotation of at least one of the pressure roller and the cylindrical body and reaction force at the spraying time of the medium, etc. Therefore, it is possible to greatly improve durability of the device for introducing and discharging the heating or cooling medium. Further, heating or cooling efficiency of the apparatus can be improved.

Further objects and advantages of the present invention will be apparent from the following description of the preferred embodiments of the present invention as illustrated in the accompanying drawings.

BRIEF DESCRIPTION OF THE DRAWINGS

FIG. 11b is a cross-sectional view showing a right-hand half of the above cylindrical body;

FIG. 26 is a partially broken front view of a nozzle portion in the rotating cylindrical treatment apparatus shown in FIG. 25; and FIG. 27 is a bottom view of the nozzle portion in FIG. 26.

DESCRIPTION OF THE PREFERRED EMBODIMENTS

The preferred embodiments of a rotating cylindrical treatment apparatus in the present invention will next be described in detail with reference to the accompanying drawings.

Figure 1:
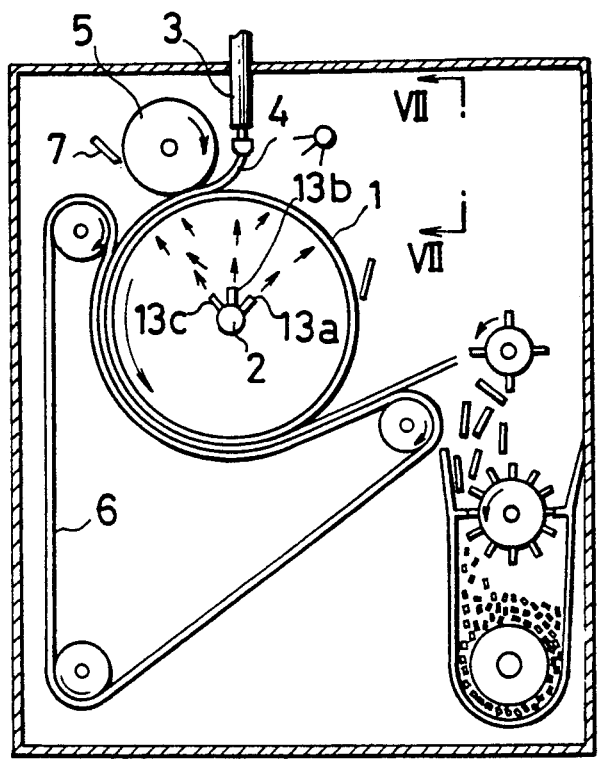
FIG. 1 is a cross-sectional view schematically showing a general rotating cylindrical treatment apparatus.

As shown in FIG. 1, a rotating cylindrical treatment apparatus is mainly constructed by a cylindrical body 1, a heating or cooling mechanism 2, a feeding section 3 for supplying a treated material 4, a pressure roller 5 and an endless belt 6. The cylindrical body 1 has a rotary shaft supported in a horizontal direction. The heating or cooling mechanism 2 is disposed within the cylindrical body 1. The treated material feeding section 3 is disposed above the cylindrical body 1. The pressure roller 5 presses and rolls the treated material 4 supplied onto the cylindrical body 1. The endless belt 6 conveys the treated material 4 while pressing the treated material 4 against the cylindrical body 1.

In this rotating cylindrical treatment apparatus, the pressure roller 5 is used to uniform the thickness of the treated material 4 so as to prevent the treated material from being irregularly heated or cooled when the treated material 4 supplied onto a surface of the cylindrical body 1 is moved in accordance with the rotation of the cylindrical body 1. Accordingly, the pressure roller 5 is used to adjust the thickness of the treated material 4 such that this thickness is a predetermined thickness. Similarly to the cylindrical body 1, the pressure roller 5 is heated or cooled to heat or cool the treated material 4 when the thickness of the treated material is adjusted.

Figure 2:
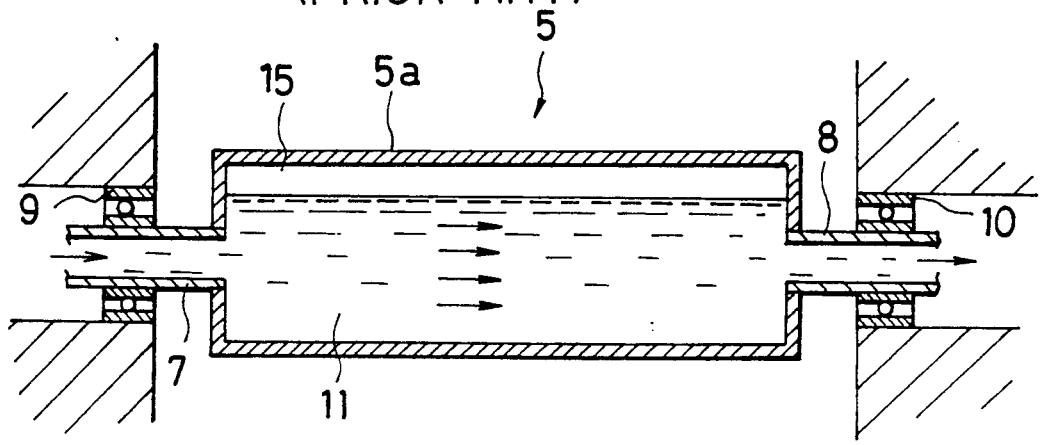
FIG. 2 is a cross-sectional view showing a pressure roller in the general rotating cylindrical treatment apparatus shown in FIG. 1.

The pressure roller 5 of this kind for heating or cooling the treated material has a roller body 5a having a small diameter. Therefore, such a device for heating or cooling a treated material as to be used in the cylindrical body 1 having a large diameter cannot be disposed in the pressure roller 5 (such device is disclosed in e.g., Japanese Utility Model Publication 9KOKOKU) No. 44-24841). Accordingly, as shown in FIG. 2, pipes 7 and 8 for introducing and discharging a heating or cooling medium are fixed by weld, etc. to central portions on both end faces of the hollow roller body 5a. The pipes 7 and 8 are respectively fitted into bearings 9 and 10 so as to rotatably support the roller body 5a.

In this pressure roller 5, an uppermost portion of an introducing system connected to the pipe 7 and an uppermost portion of a discharging system connected to the pipe 8 are located above an upper portion of the roller body 5a on a circumferential face of the pressure roller 5 so as to approximately fill the roller body 5a with the heating or cooling medium 11. Thus, the heating or cooling medium flows into the roller body 5a from the pipe 7. The roller body 5a is filled with the heating or cooling medium 11 even when the discharging pipe 8 is connected to the central portion on an end face of the roller body 5a. Only an amount of the medium flowing into the roller body 5a from the introducing pipe 7 is discharged from the roller body 5a through the discharging pipe 8.

Figure 3:
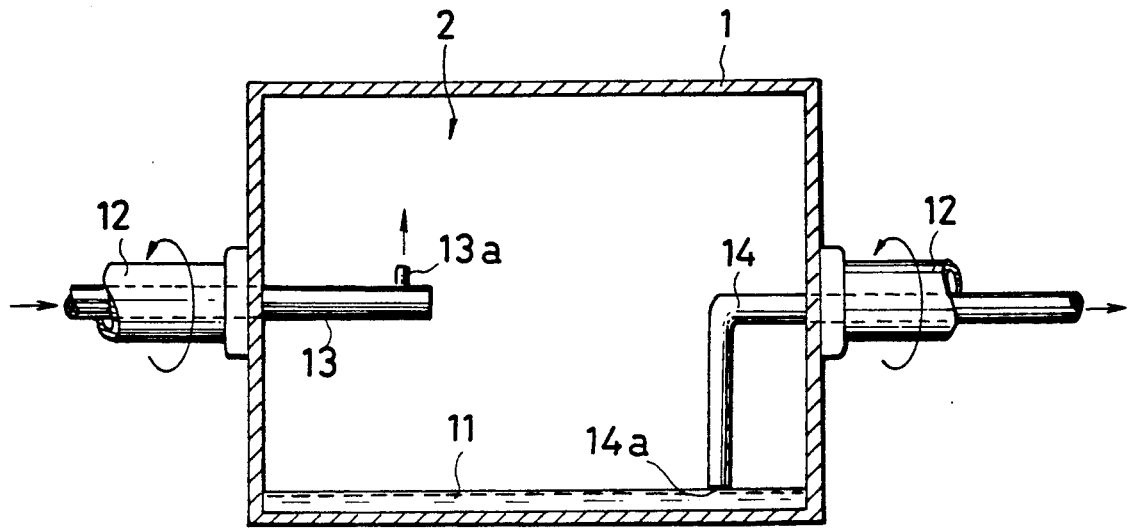
FIG. 3 is a cross-sectional view showing a cylindrical body in the general rotating cylindrical treatment apparatus shown in FIG. 1.

As shown in FIG. 3, the heating or cooling mechanism 2 arranged within the cylindrical body 1 has pipes 13 and 14 which are inserted into hollow support shafts 12 connected to the cylindrical body 1 and which respectively supplies and discharges the heating or cooling medium 11. The hollow support shafts 12 are disposed on both sides of the cylindrical body 1 and have central axes in conformity with a central axis of the cylindrical body 1. The hollow support shafts 12 respectively have openings at ends thereof and these openings are opened toward the interior of the cylindrical body 1. One end of the feed pipe 13 located within the cylindrical body 1 is closed. As shown in FIG. 1, a plurality of spraying nozzles 13a, 13b and 13c are disposed in a portion of the feed pipe 13 in the vicinity of the closed end thereof such that radial directions of these spraying nozzles are different from each other. The other end of the feed pipe 13 is connected in an outside of the corresponding support shaft 12 to an unillustrated source for supplying pressurized air and the heating or cooling medium 11.

One end of the discharging pipe 14 located within the cylindrical body 1 is bent downward and has a suction port 14a opened in the vicinity of a lower portion of the cylindrical body 1 on an inner surface thereof. The other end of the discharging pipe 14 extends through the corresponding support shaft 12 to the exterior of the corresponding support shaft 12 and is opened in suitable positions.

In such a heating or cooling mechanism 2, the pressurized air and the heating or cooling medium 11 which are mixed with each other are sprayed from spraying nozzles 13a, 13b and 13c of the feed pipe 13 and are blown against an inner circumferential face of the rotating cylindrical body 1, thereby heating or cooling the cylindrical body 1. The medium 11 blown against the inner circumferential face of the cylindrical body 1 is subsequently stored in to a lower portion of the cylindrical body 1. The medium 11 is then discharged by the pressure of the pressurized air within the cylindrical body 1 from the suction portion 14a of the discharging pipe 14 to the exterior thereof using a siphon effect.

In the above pressure roller 5, a space portion 15 is formed at any time in an interior of the roller body since gas is left in an upper portion of the roller body 5a. A flow of the medium from the introducing pipe 7 to the discharging pipe 8 within the roller body 5a is a laminar flow and has a low speed. Therefore, the coefficient of heat transfer of this flow is low so that it is impossible to efficiently heat or cool the pressure roller 5.

Further, in the heating or cooling mechanism 2 within the cylindrical body 1, both the feed pipe 13 and the discharging pipe 14 are supported in the shape of a cantilever. Accordingly, the feed pipe 13 and the discharging pipe 14 are vibrated by reaction force caused by the injection of the pressurized air and the heating or cooling medium which are mixed with each other, vibration of the cylindrical body 1 caused by the rotation thereof, and so forth. Therefore, there is a fear that the feed pipe 13 and the discharging pipe 14 are deformed or damaged since resonance is caused by the vibrations of the feed pipe 13 and the discharging pipe 14. Further, it is difficult to uniformly wet an inner wall of the cylindrical body with the medium.

Further, in the above-mentioned rotating cylindrical treatment apparatus, when the treated material 4 is constructed by e.g., an adhesive or paste sticky with respect to a metal, the treated material 4 is not separated from the pressure roller 5, but is wound around the pressure roller 5 when the treated material 4 supplied onto a surface of the cylindrical body 1 from the feeding section 3 is rolled by the pressure roller 5.

Figure 4:
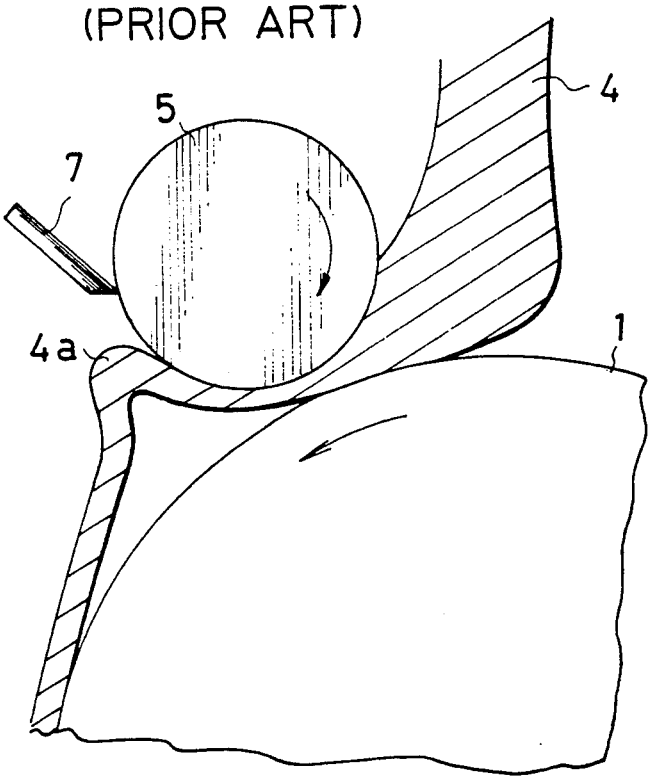
FIG. 4 is an explanatory view showing a state in which a treated material discharged from the pressure roller is partially raised from a circumferential face of a cylindrical body in the general rotating cylindrical treatment apparatus shown in FIG. 1.

In the above rotating cylindrical treatment apparatus, the pressure roller 5 has a smooth surface. Therefore, when the treated material 4 is continuously rolled by the pressure roller 5, the rolled treated material 4 is not separated from the pressure roller 5, but is attached to the pressure roller 5 as shown by a material portion 4a in FIG. 4. Thus, the treated material 4 is partially raised from a circumferential face of the cylindrical body 1, so that the thickness of the rolled treated material 4 cannot be constantly uniformed. Further, when the treated material is formed in the shape of a thread in the rolling operation thereof, a thread portion goes out through a scraper 7 for scraping the treated material 4 attached onto the pressure roller 5 to thereby be wound around the pressure roller 5.

Further, when the treated material 4 such as resin is first attached to a leading end of the scraper 7, the resin is further attached to a resin portion attached to the leading end of the scraper 7, so that this resin portion grows and is solidified. Finally, a block of the treated material is formed at the leading end of the scraper 7. Therefore, the operation of the rotating cylindrical treatment apparatus must be stopped to remove the block of the treated material attached to the scraper 7.

When the treated material 4 is constructed by resin such as toner, etc., the resin is attached to the pressure roller 5 therearound. The attached resin presses the scraper 7 and passes through the scraper 7 in a certain case, so that the attached resin is not separated from the pressure roller 5.

Figure 5:
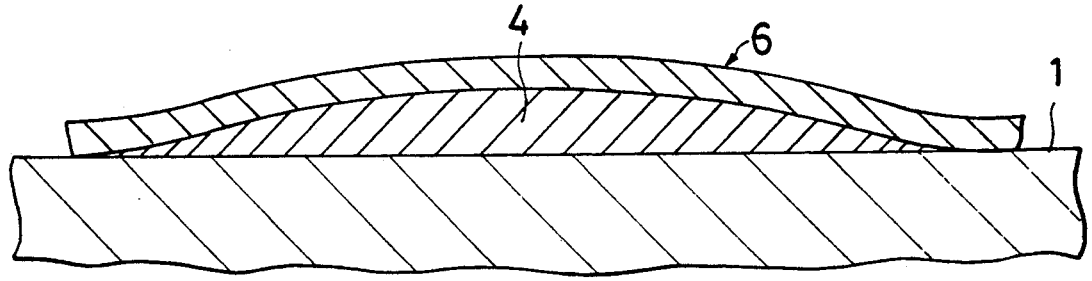
FIG. 5 is a cross-sectional view showing a state in which the treated material comes in press contact with the cylindrical body by an endless belt in the general rotating cylindrical treatment apparatus.

Further, in the general rotating cylindrical treatment apparatus, the cylindrical body 1 and the endless belt 6 have smooth surfaces and the treated material 4 is a viscous fluid such as molten resin in a certain case. Accordingly, when the treated material 4 is conveyed by the endless belt 6 in a state in which the treated material 4 is in press contact with the circumferential face of the cylindrical body 1, the treated material 4 becomes thick in a central position of the belt 6 in a width direction thereof and becomes thin at both ends of the belt 6 as shown in FIG. 5. Therefore, it is difficult to uniform the thickness of the treated material 4 in the shape of flakes rolled by the pressure roller 5 in the width direction of the belt 6.

Figure 6:
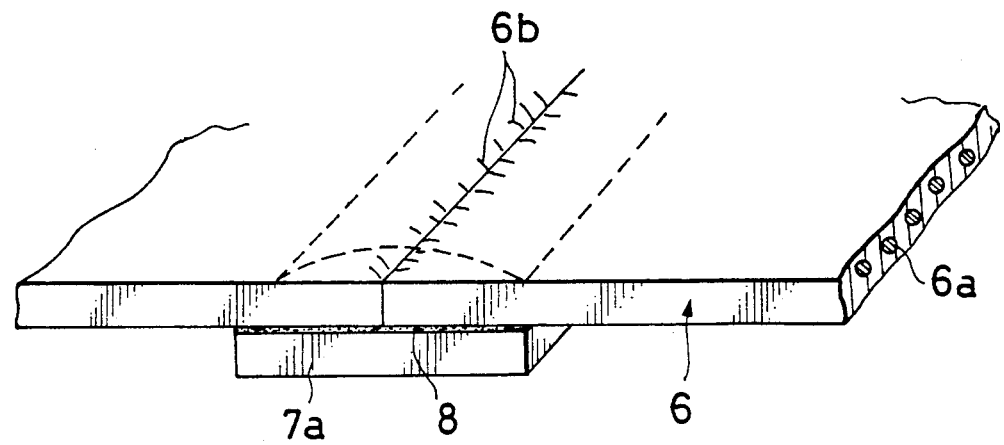
FIG. 6 is a perspective view showing joining portions of the endless belt used in the general rotating cylindrical treatment apparatus shown in FIG. 1.

As shown in FIG. 6, in the endless belt 6, a sheet-like material formed by glass fibers 6a is coated with fluororesin to form a single belt. Both ends of this single belt are joined to each other, and then a reinforcing plate 7a made of the same material as the single belt is arranged between joining ends of the single belt on a rear face thereof which does not come in contact with the treated material 4. The reinforcing plate 7a is adhered to the joining portions of the single belt by an adhesive 8 such as a heat seal film type binder, a coating type binder, etc.

However, in the general rotating cylindrical treatment apparatus, the glass fibers 6a at the joining ends of the endless belt 6 are exposed in the shape of a feather on the front side of the endless belt 6. The treated material is attached to feathery glass fibers 6b and then grows. In particular, in a treatment apparatus in which the endless belt 6 is wound around the pressure roller 5 and the treated material 4 is constructed by e.g., molten resin, the molten resin immediately comes in contact with the endless belt 6 so that a lot of the treated material is attached to the feathery glass fibers 6b. Therefore, the treated material 4 cannot be fed from the cylindrical body 1 as a sheet-like material having a uniform thickness. Accordingly, the operation of the rotating cylindrical treatment apparatus must be often stopped to remove the resin attached to the joined portions of the endless belt 6.

Figure 7:
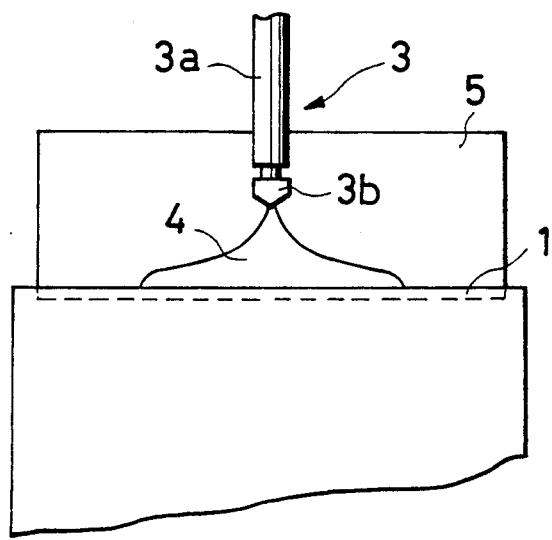
FIG. 7 is a front view taken along line VII—VII in FIG. 1 and showing an outflow state in which the treated material is fed from a nozzle portion to the cylindrical body in the general rotating cylindrical treatment apparatus.

In the general rotating cylindrical treatment apparatus, as shown in FIG. 7, the feeding section 3 is provided with a nozzle portion 3b attached to a leading end of a feed pipe 3a connected to an unillustrated source for supplying the treated material. The feeding section 3 is positioned in a central portion of the cylindrical body 1 with respect to a width direction of the cylindrical body 1. The nozzle portion 3b is provided with one circular opening. The treated material 4 is fed from this circular opening to the central portion of the cylindrical body 1 with respect to the width direction of the cylindrical body 1. The treated material 4 is then rolled by the pressure roller 5 at a predetermined thickness while the treated material spreads toward both ends of the cylindrical body 1 by fluidity thereof. The treated material 4 is further pressed and spreaded on opposite sides thereof by the rolling operation of the treated material. Thus, the treated material 4 is approximately formed in the shape of a sheet corresponding to the width of the cylindrical body 1. Thereafter, the treated material 4 is conveyed by the endless belt 6 in a state in which the treated material 4 comes in close contact with the cylindrical body 1. In the meantime, the treated material 4 is cooled or heated.

In the above general rotating cylindrical treatment apparatus, the width of the cylindrical body 1 is set to about 1.5 m at its maximum. However, a relatively large-sized cylindrical body having a width wider than 1.5 m has been recently used to improve capacity.

In the rotating cylindrical treatment apparatus using such a large-sized cylindrical body, there is a serious problem about the feeding section 3 for supplying the treated material 4 as follows. When the cylindrical body is large-sized, the size of the opening of the feeding section 3 in the nozzle portion 3b thereof is increased in accordance with a supplying amount of the treated material 4. However, when the cylindrical body is large-sized and a large amount of the treated material 4 is supplied to the central portion of the feeding section 3 in the width direction thereof, the treated material is solidified on both sides thereof while the treated material spreads toward both ends of the cylindrical body. Accordingly, it is difficult to spread the treated material in a predetermined range before the treated material is rolled by the pressure roller 5.

This problem is caused in the case of the large-sized cylindrical body, but is also caused in a case in which the treated material having a low fluidity is supplied. In the case of the treated material having a low fluidity, it takes such time to spread the treated material in a predetermined range even when the treated material is supplied from the feeding section 3 onto a circumferential face of the cylindrical body. Accordingly, the treated material is solidified on both sides thereof until the treated material spreads at both ends of the cylindrical body even when a rotary speed of the cylindrical body is reduced to provide a sufficient time until the rolling operation of the treated material.

Figure 8:
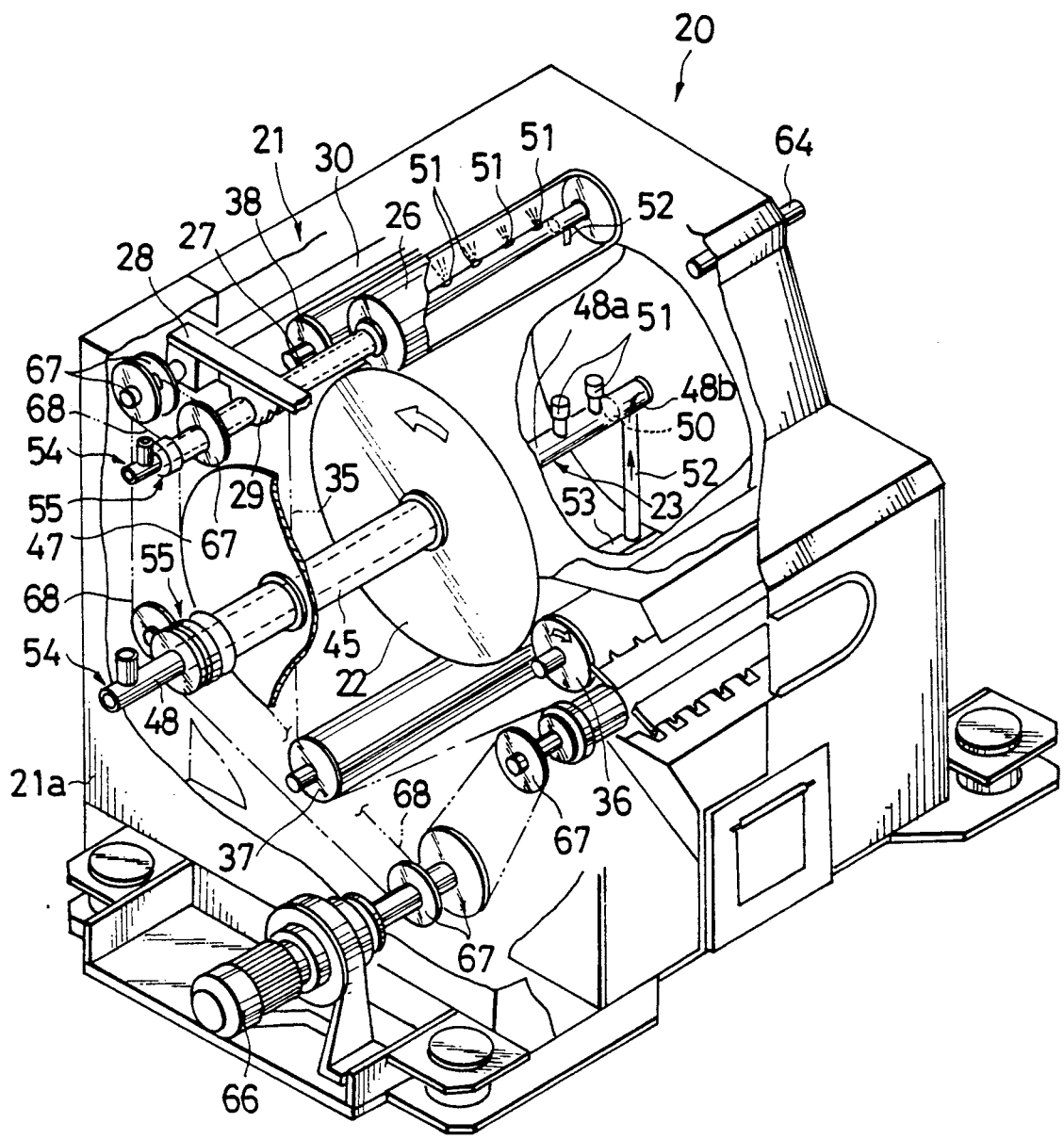
FIG. 8 is a partially broken perspective view of a casing in a rotating cylindrical treatment apparatus in accordance with a first embodiment of the present invention.
Figure 9:
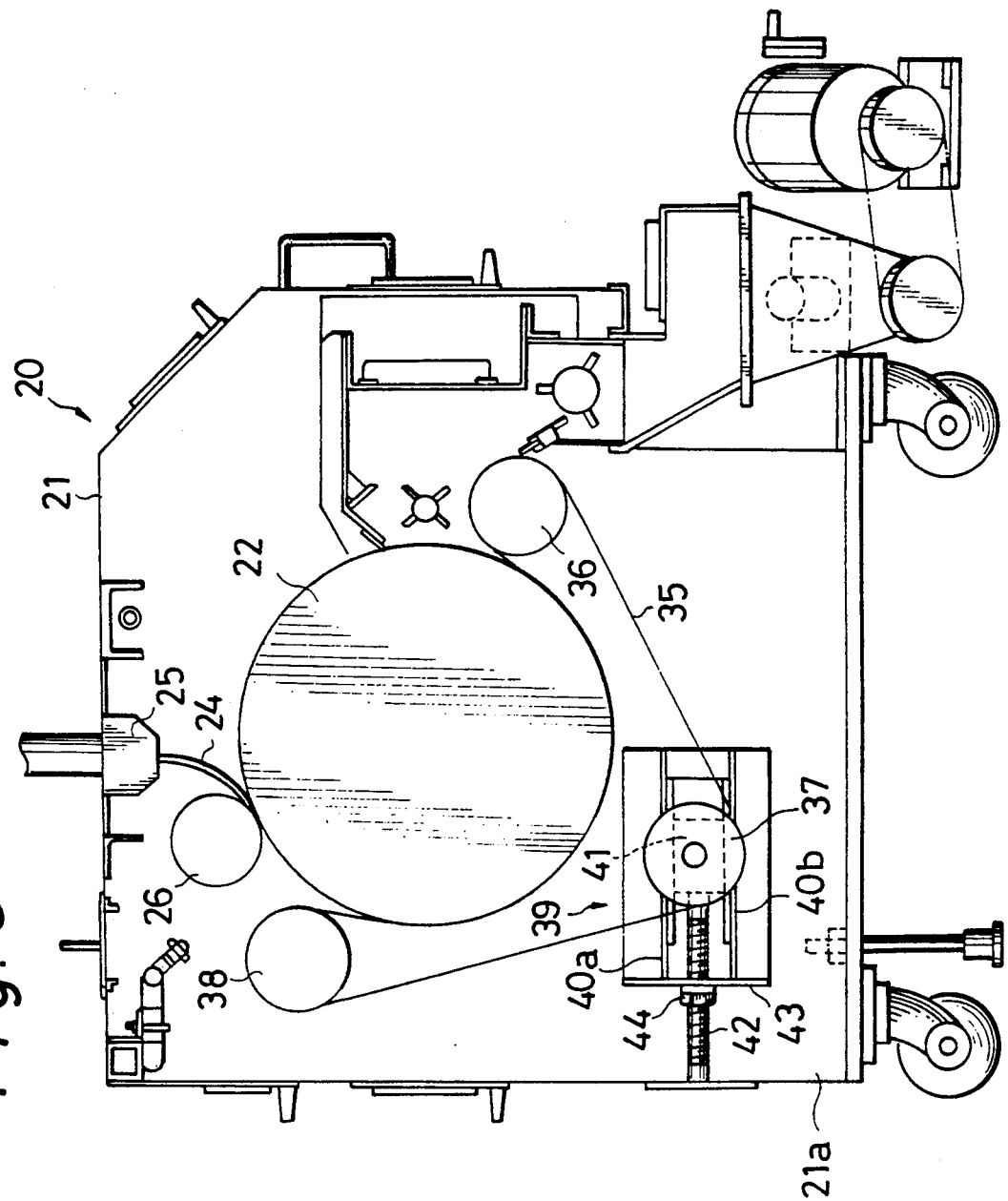
FIG. 9 is a longitudinal sectional view schematically showing the rotating cylindrical treatment apparatus shown in FIG. 8.

FIGS. 8 and 9 show a rotating cylindrical treatment apparatus 20 in accordance with a first embodiment of the present invention.

The rotating cylindrical treatment apparatus 20 is provided with a cylindrical body 22 rotatably arranged within a casing 21. A device 23 for introducing or discharging a heating or cooling medium is disposed within the cylindrical body 22 to heat or cool an outer circumferential face of the cylindrical body 22. A feeding section 25 for supplying a treated material 24 onto a surface of the cylindrical body 22 is arranged above the cylindrical body 22.

Figure 10:
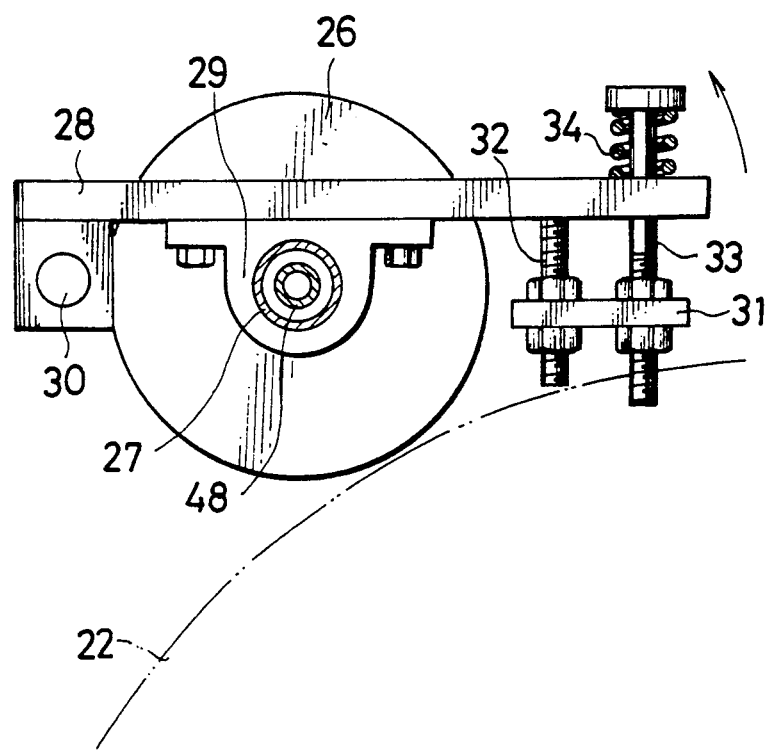
FIG. 10 is an explanatory view showing the construction of a means for supporting a pressure roller and adjusting the position thereof.

A pressure roller 26 is adjacent to the feeding section 25 on the side of an outer circumferential portion of the cylindrical body 22. The pressure roller 26 presses the treated material 24 discharged from the feeding section 25 against a surface of the cylindrical body 22 to roll the treated material in a rotary direction of the cylindrical body 22. As shown in FIG. 10, a support shaft 27 of the pressure roller 26 is supported by a bearing 29 attached to an intermediate portion of each of two arms 28 (only one arm is shown in FIG. 8) arranged on both sides of the roller 26. One end of each of the arms 28 is rotatably supported by a stationary section such as the casing 21 through a shaft 30. Thus, the pressure roller 26 is moved toward or away from the cylindrical body 22 by swinging each of the arms 28 around the shaft 30. The other end of each of the arms 28 is attached to a constructional portion of the treatment apparatus by bolts 32 and 33 screwed into a support plate 31 attached to the stationary section such as the casing 21 so as to adjust the position of each of the arms 28 and pressing force applied thereto. The bolts 32 and 33 respectively constitute a distance adjusting bolt and a pressing force adjusting bolt. Namely, in FIG. 10, when the distance adjusting bolt 32 is moved upward or downward, the pressure roller 26 is moved upward or downward with respect to the cylindrical body 22 so that the distance between the pressure roller 26 and the cylindrical body 22 can be adjusted. When the pressing force adjusting bolt 33 is moved upward or downward, it is possible to adjust the resilient force of a spring 34. Accordingly, it is possible to adjust pressing force of the pressure roller 26 with respect to the treated material 24.

An endless belt 35 is partially wound around an outer circumferential face of the cylindrical body 22 and conveys the treated material 24 rolled by the pressure roller 26. This endless belt 35 is wound around three guide rollers 36, 37 and 38. In this case, a portion of the endless belt 35 between the guide rollers 36 and 38 is wound around a portion of the cylindrical body 22.

Tension of the endless belt 35 can be adjusted by a pair of tension adjusting devices 39 for supporting the guide roller 37. The pair of tension adjusting devices 39 are disposed on an inner face of a side plate 21a which is opposite to these adjusting devices and which constitutes the casing 21. Each of the tension adjusting devices 39 are provided with two guide rails 40a and 40b arranged upward and downward while being spaced from each other and fixed to the side plate 21a. A bearing block 41 is slidably arranged between the guide rails 40a and 40b and rotatably supports a shaft portion of the guide roller 37. An adjusting bolt 42 is connected to an end portion of the bearing block 41 and is inserted into an opening of a fixed plate 43 connected to end portions of the guide rails 41a and 40b. An adjusting nut 44 is screwed onto the adjusting bolt 42 inserted into the opening of the fixed plate 43.

Thus, the adjusting bolt 42 is axially moved by rotating this nut 44 rightward or leftward so that the bearing block 41 is moved along the guide rails 40a and 40b. The position of the guide roller 37 is changed by moving the bearing block 41 supporting shaft portions of the guide roller 37 on both sides thereof so that the tension of the endless belt 35 can be adjusted.

Figure 11A:
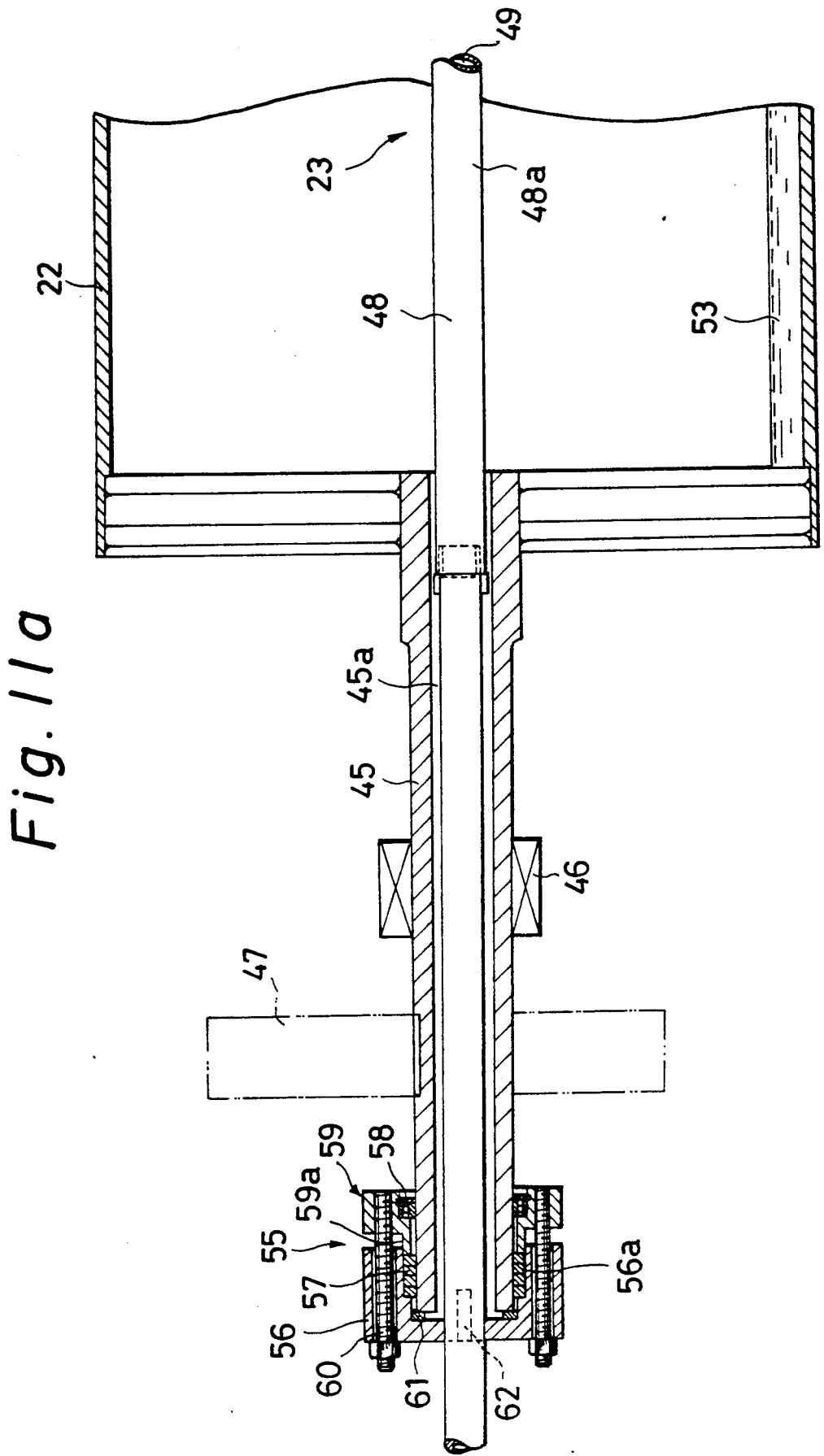
FIG. 11a is a cross-sectional view showing a left-hand half of a cylindrical body in which a device for introducing and discharging a heating or cooling medium is disposed.

A device for introducing and discharging the heating or cooling medium is also disposed in the pressure roller 26 and is approximately similar to that disposed in the cylindrical body 22. Accordingly, the construction of the device 23 for introducing and discharging the heating or cooling medium and disposed in the cylindrical body 22 will next be described with reference to FIGS. 11a and 11b.

The cylindrical body 22 is supported by a hollow support shaft 45 fixed to each of both side walls of the cylindrical body. A central axis of the support shaft 45 is in conformity with that of the cylindrical body 22. The support shaft 45 has an opening at an end thereof and this opening is opened toward the interior of the cylindrical body 22. The support shaft 45 corresponds to the support shaft 27 in the case of the pressure roller 26. These two support shafts 45 are rotatably held by bearings 46 arranged in suitable positions. One support shaft 45 is rotated by driving force from a sprocket 47 keyed to the other support shaft 45.

The medium introducing-discharging device 23 for heating or cooling the cylindrical body 23 includes one pipe body 48 extending through a hollow portion 45a of the support shaft 45 and the cylindrical body 22. An inner passage 49 within the pipe body 48 is closed by a plug 50 located within the cylindrical body 22 and disposed in a pipe body portion on the side of one wall of the cylindrical body 22. Thus, the pipe body 48 is substantially divided into an introducing side pipe section 48a and a discharging side pipe section 48b. A plurality of nozzle portions 51 for injecting air and heating or cooling liquid which are mixed with each other are disposed in the introducing side pipe section 48a. In the device for introducing and discharging the heating or cooling medium in the pressure roller 26, many holes are disposed in the introducing side pipe section 48a of the pipe body and correspond to the nozzle portions 51. One end of a suction pipe portion 52 is connected to the discharging side pipe section 48b such that internal passages within the suction pipe portion 52 and the discharging side pipe section 48b are communicated with each other. A suction port 52a is disposed at the other end of the suction pipe portion 52 and is located in proximity to a liquid face of a medium 53 stored within a lower portion of the cylindrical body 22. The opposite ends of the pipe body 48 composed of the introducing side pipe section 48a and the discharging side pipe section 48b extending through the support shafts 45 respectively constitute a medium introducing portion 54 shown in FIG. 8 and an unillustrated medium discharging port.

Sealing devices 55 for sealing the support shafts 45 are disposed at ends of the support shafts 45 receiving the introducing side pipe section 48a and the discharging side pipe section 48b.

Each of the sealing devices 55 has a packing holding ring 56 having a U-shape in cross section. The pipe body 48 extends through a central portion of the packing holding ring 56 and the packing holding ring 56 is fixed to this pipe body. This holding ring 56 has a recessed portion on a side thereof. An end portion of the support shaft 45 is fitted into the recessed portion of the holding ring 56. A large diameter portion 56a having a constant width is formed on an inner circumferential face of the holding ring 56 on an open side thereof. A gland packing 57 is disposed in the large diameter portion 56a. This gland packing 57 is pressed by a cylindrical pressing portion 59a axially projecting on a side of a pressing ring 59. The pressing ring 59 is fitted to an outer circumferential portion of the support shaft 48 and is supported by an internal bearing 58. The gland packing 57 hermetically comes in contact with an outer circumferential face of each of the support shafts 45. A through bolt 60 is inserted into the holding ring 56 and is screwed into the pressing ring 59. The pressing ring 59 is moved onto the side of the holding ring 56 by fastening the through bolt 60 with respect to the pressing ring 59, thereby applying pressing force to the gland packing 57. A Teflon (PTFE) processing is performed with respect to a spacer ring 61. The spacer ring 61 is disposed between an end face of the rotating support shaft 45 and an opposite face of the holding ring 56 to prevent wearing caused by direct contact between the end face of the support shaft 45 and an inner wall of the fixed holding ring 56 in the side recessed portion thereof. A lug portion 62 is formed in an outer circumferential portion of the holding ring 56 and is projected outward in a diametrical direction of the holding ring 56. The lug portion 62 is attached to a stationary section such as the casing 21.

The sealing device 55 is also disposed at an end of the support shaft 27 for supporting the pressure roller 26. In the sealing device 55 disposed at the end of the support shaft 27, the support shaft 27 and the entire pipe body 48 inserted into this support shaft 27 can be swung by the arm 28. Accordingly, the holding ring 56 is not fixed to the casing 21, but is fixed to the pipe body 48 by weld.

Figure 12:
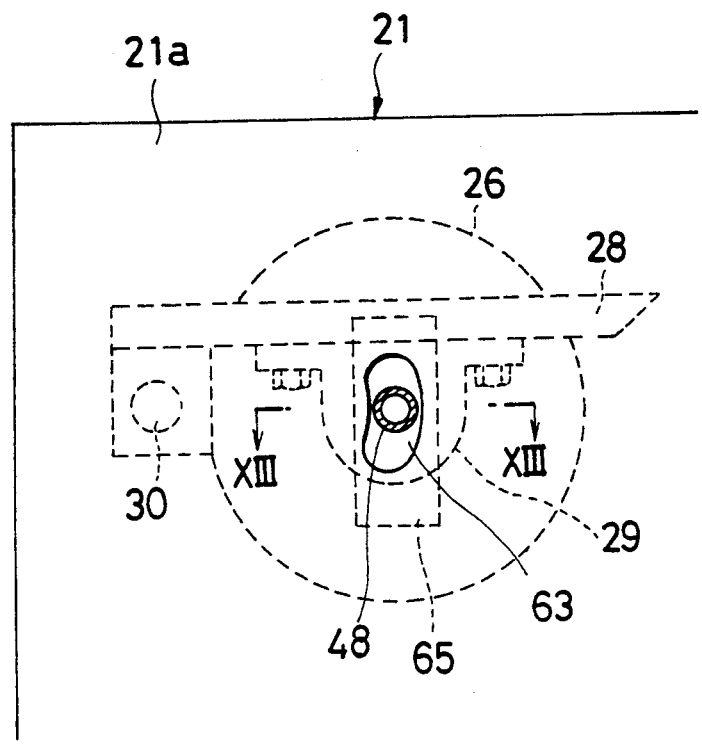
FIG. 12 is a front view partially showing a side plate through which a pipe body inserted into a support shaft of the pressure roller extends.
Figure 13:
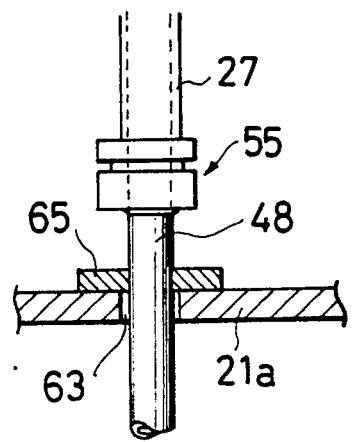
FIG. 13 is a cross-sectional view of the side plate taken along line XIII—XIII in FIG. 12.

As mentioned above, the pipe body 48 projecting from the support shaft 27 of the pressure roller 26 is projected outward from the side plate 21a of the casing 21. As shown in FIG. 12, since the pipe body 48 is swung, an opening 63 for receiving this pipe body is formed in the shape of an arc slot along a locus of a swinging movement of the pipe body 48. In the rotating cylindrical treatment apparatus 20, surfaces of the pressure roller 26 and the cylindrical body 22 are wet with dew when molten resin, etc. are treated by cooling the pressure roller 26 and the cylindrical body 22. Therefore, dry air is supplied into the casing 21 by an air feed pipe 64 as shown in FIG. 8. Accordingly, the casing 21 preferably has a sealing structure. An arc slot 63 for escape is formed in the side plate 21a when the pipe body 48 extending through the support shaft 27 of the pressure roller 26 is swung. Accordingly, there is a fear that external air having high humidity flows into the casing through this arc slot 63. Therefore, as shown in FIGS. 12 and 13, a shielding member 65 such as a rubber plate is attached to the pipe body 48 in a position in contact with an inner face of the side plate 21a. The size of the shielding member 65 is constructed such that the slot 63 can be closed even when the pipe body 48 is swung.

In FIG. 8, reference numerals 66, 67 and 68 respectively designate a motor, sprockets attached to the respective shafts, chains suitably wound around the respective sprockets 67.

The operation of the rotating cylindrical treatment apparatus 20 in this embodiment will next be described.

The treated material 24 is supplied from the feeding section 25 to a surface of the cylindrical body 22. The treated material 24 is then rolled by the pressure roller 26 and simultaneously comes in close contact with an outer circumferential face of the cylindrical body 22 while the treated material 24 is rotated by the endless belt 35 in a predetermined rotary range. Thus, the treated material 24 is sufficiently heated or cooled. In this case, the heating or cooling medium 53 is sprayed from the nozzle portions 51 as a medium spraying means through the introducing side pipe section 48a of the pipe body 48. The medium 53 stored within the pressure roller 26 and the lower portion of the cylindrical body 22 is discharged from the suction port 52a of the suction pipe portion 52 through the discharging side pipe section 48b of the pipe body 48 by a siphon effect caused by inner pressures of the pressure roller 26 and the cylindrical body 22.

As mentioned above, the rotating cylindrical treatment apparatus in the first embodiment of the present invention is constructed by a single pipe body for supplying a medium for heating or cooling the pressure roller and the cylindrical body to the interiors thereof. Discharging portions of the single pipe body extend through the pressure roller and the cylindrical body. Accordingly, it is possible to prevent the treatment apparatus from being vibrated by vibration caused by the rotations of the pressure roller and the cylindrical body and reaction force at the spraying time of the medium, etc. Therefore, it is possible to greatly improve durability of the device for introducing and discharging the heating or cooling medium. Further, heating or cooling efficiency of the apparatus can be improved.

Figure 14:
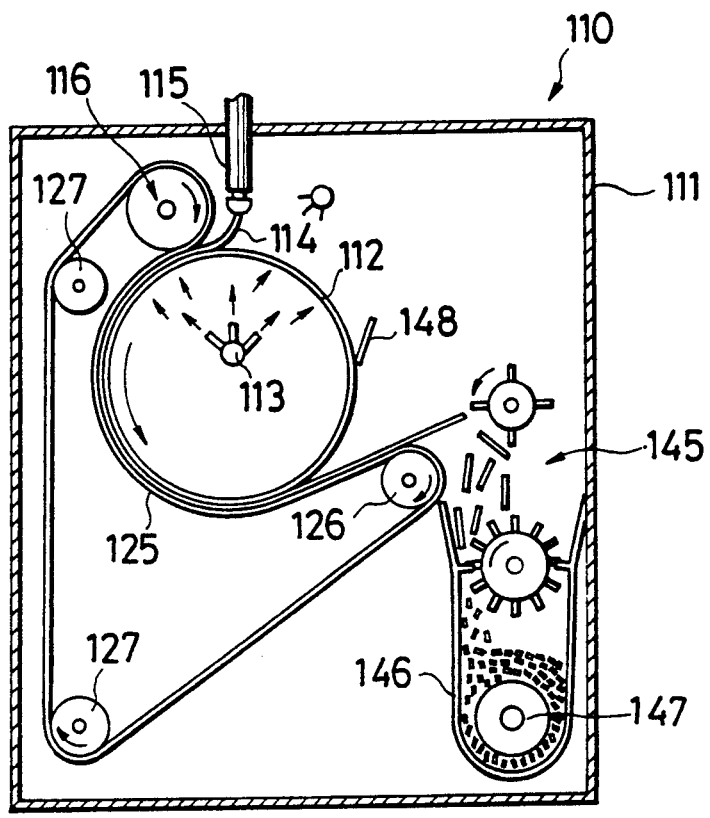
FIG. 14 is an explanatory view schematically showing the construction of a rotating cylindrical treatment apparatus in a second embodiment of the present invention.

FIG. 14 shows a rotating cylindrical treatment apparatus 110 in a second embodiment of the present invention.

The rotating cylindrical treatment apparatus 110 is provided with a cylindrical body 112 rotatably arranged within a casing 111. An introducing port 113 of a heating or cooling medium fed from an unillustrated heater or cooler is disposed within the cylindrical body 112 to heat or cool an outer circumferential face of the cylindrical body 112. A feeding section 115 for supplying a treated material 114 onto a surface of the cylindrical body 112 is arranged above the cylindrical body 112.

Figure 15:
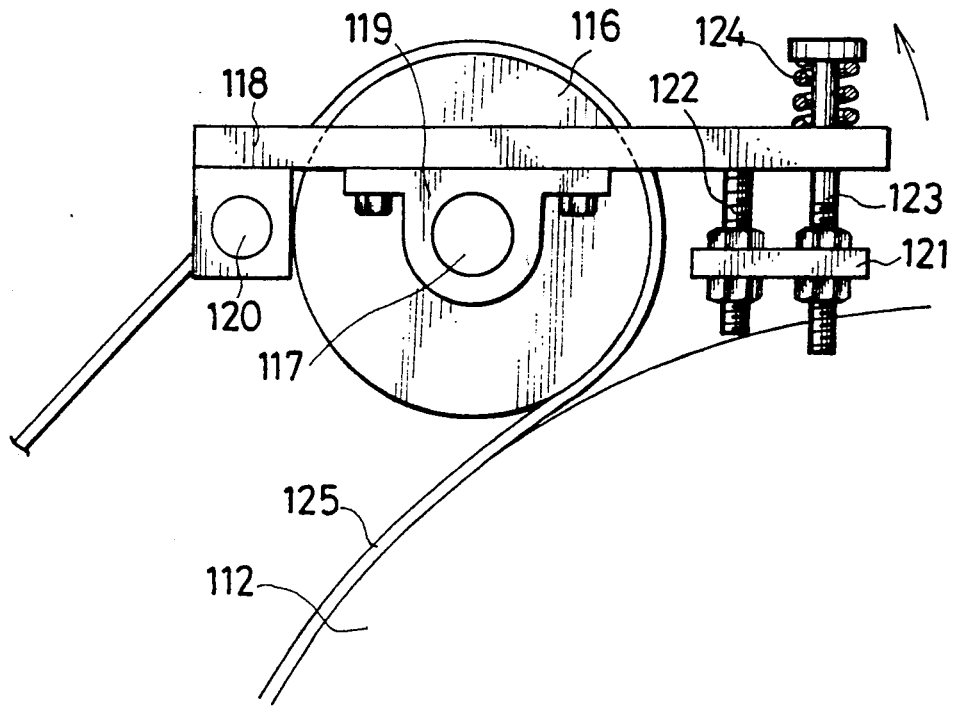
FIG. 15 is an explanatory view schematically showing the construction of a device for adjusting the distance between a pressure roller and a cylindrical body.

A pressure roller 116 is adjacent to the feeding section 115 in an outer circumferential portion of the cylindrical body 112. The pressure roller 116 presses the treated material 114 discharged from the feeding section 115 against a surface of the cylindrical body 112 and rolls the treated material in a rotary direction of the cylindrical body 112. As shown in FIG. 15, the pressure roller 116 is supported by a bearing 119 having a central support shaft 117 attached to an intermediate portion of an arm 118. One end of the arm 118 is rotatably supported by a stationary section such as the casing 111 through a shaft 120. Thus, the pressure roller 116 is moved toward or away from the cylindrical body 112 by swinging the arm 118 around the shaft 120. The other end of the arm 118 is attached to a constructional portion of the treatment apparatus by bolts 122 and 123 screwed into a support plate 121 attached to the stationary section such as the casing 111 so as to adjust the position of the arm 118 and pressing force applied thereto. The bolts 122 and 123 respectively constitute a distance adjusting bolt and a pressing force adjusting bolt. Namely, in FIG. 15, when the distance adjusting bolt 122 is moved upward or downward, the pressure roller 116 is moved upward or downward with respect to the cylindrical body 112 so that the distance between the pressure roller 116 and the cylindrical body 112 can be adjusted. When the pressing force adjusting bolt 123 is moved upward or downward, it is possible to adjust the resilient force of a spring 124. Accordingly, it is possible to adjust pressing force of the pressure roller 116 with respect to the treated material 114.

An endless belt 125 is partially wound around an outer circumferential face of the cylindrical body 112 and conveys the treated material 114 rolled by the pressure roller 116. This endless belt 125 is wound around a drive roller 126, two guide rollers 127 and the pressure roller 116. In this case, a portion of the endless belt 125 between the drive roller 126 and the pressure roller 116 is wound around a portion of the cylindrical body 112. As mentioned above, since the endless belt 125 is wound around the pressure roller 116, the guide rollers 127, etc., the treated material 114 discharged from the feeding section 115 is rolled through the endless belt 125 without any direct contact between the treated material 114 and the pressure roller 116. In this case, the pressing force applied by the pressure roller 116 through the endless belt 125 to the treated material 114 is not changed in comparison with that in the case in which the treated material is directly pressed by the pressure roller 116.

Figure 16A:
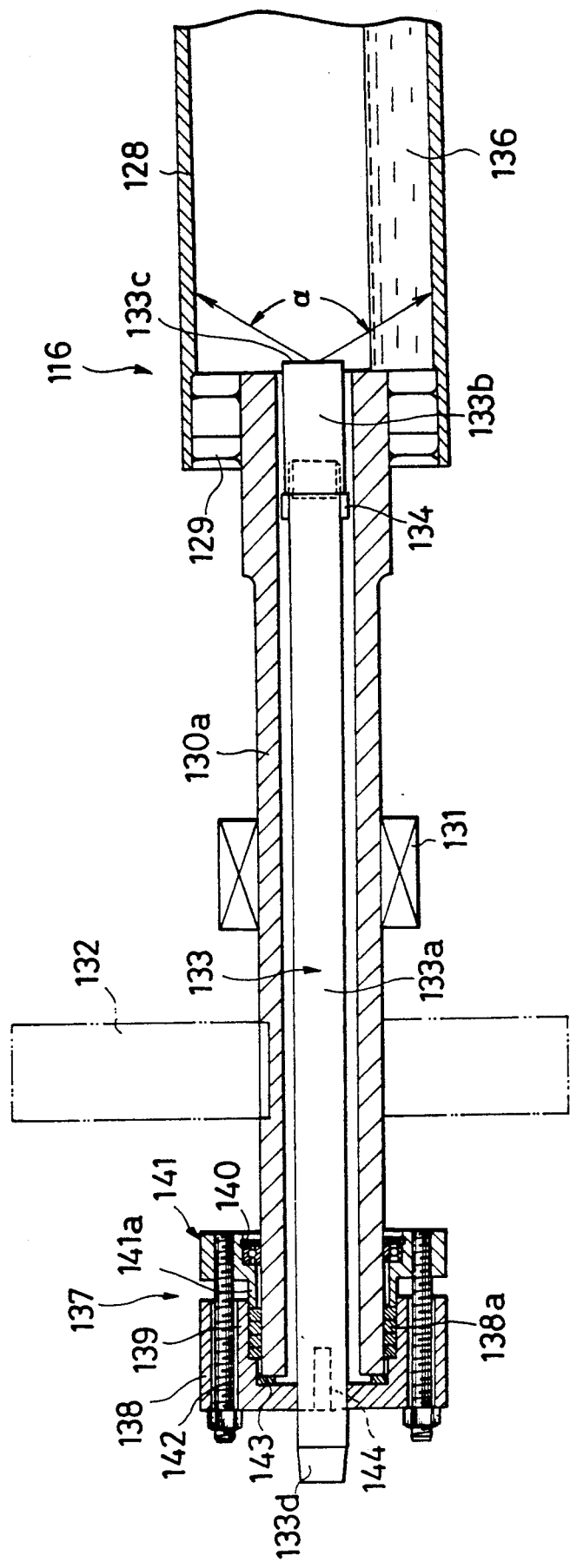
FIG. 16a is a cross-sectional view showing a left-hand half of the pressure roller.
Figure 16B:
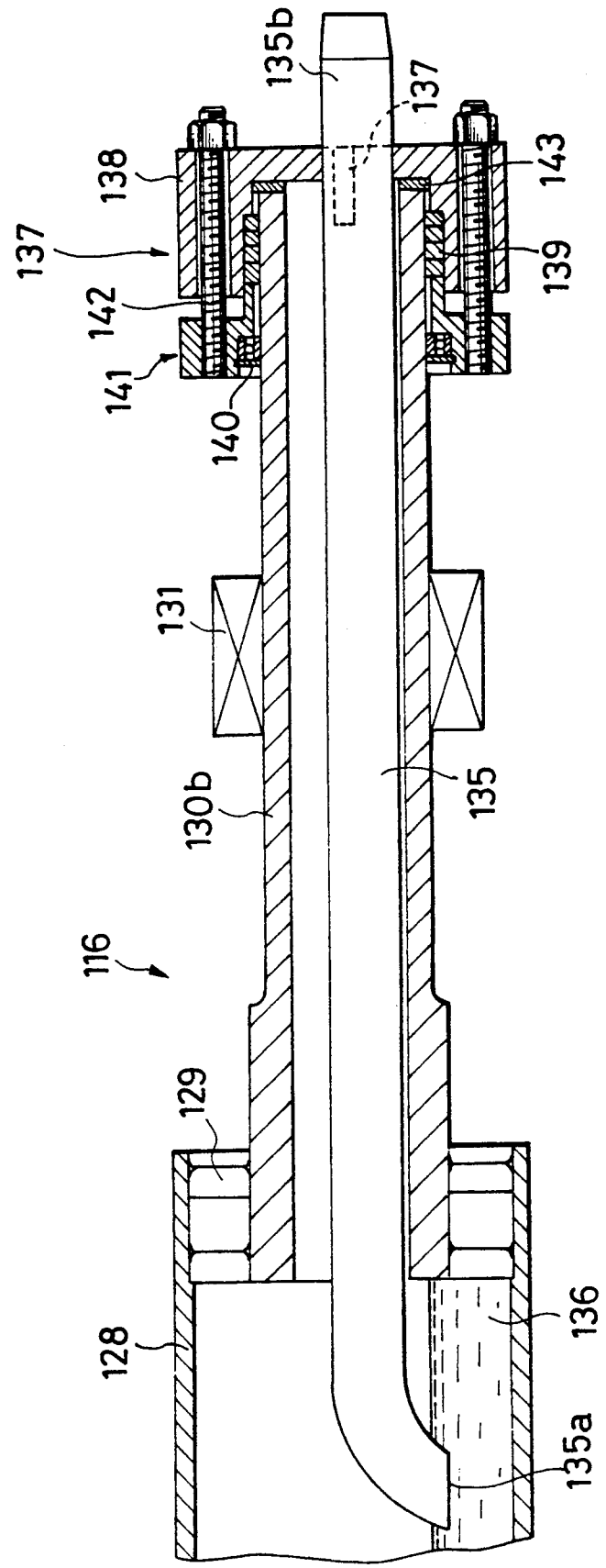
FIG. 16b is a cross-sectional view showing a right-hand half of the pressure roller.

Similarly to the cylindrical body 112, the pressure roller 116 has a cooling or heating mechanism therein. Namely, as shown in FIGS. 16a and 16b, the pressure roller 116 has a hollow roller body 128 for pressing and rolling the treated material 114 on the circumferential surface of the cylindrical body 112 through the endless belt 125 as mentioned above. One ends of tubular support members 130a and 130b are respectively attached to central portions of wall portions 129 of the roller body 128 at both ends thereof. Central axes of the support members 130a and 130b are in conformity with a central axis of the roller body 128. The support members 130a and 130b respectively have openings at ends thereof and these openings are opened toward the interior of the roller body 128. These two support members 130a and 130b are supported by bearings 131 fitted thereto in suitable positions, thereby rotatably supporting the roller body 128. The roller body 128 receives driving force from a sprocket 132 keyed to the support member 130a so that the roller body 128 is rotated together with the support members 130a and 130b.

An introducing pipe 133 is arranged within the support member 130a and introduces a pressurized gas and a cooling or heating medium, which are mixed with each other, into the roller body 128. The introducing pipe 133 is constructed by a pipe body 133a and a spraying nozzle pipe 133b attached to the pipe body 133a at one end thereof. A spraying nozzle port 133c of the spraying nozzle pipe 133b is slightly projected from the opening of the support member 130a at one end thereof into the roller body 128 and is positioned in an axial direction of the roller body 128. A spraying angle α of the spraying nozzle port 133c is set to about 120° around the central axis of the roller body 128. A spacer ring 134 is fitted to a connecting portion between the pipe body 133a and the spraying nozzle pipe 133b in the introducing pipe 133 so as to prevent direct contact between the pipe body 133a and an inner wall of the support member 130a. A Teflon (PTFE) processing is performed with respect to the spacer ring 134.

A discharging pipe 135 is arranged within the support member 130b. One end of the discharging pipe 135 is guided into the roller body 128 and is bent downward. The discharging pipe 135 is provided with a suction port 135a at one end thereof and is immersed in a cooling or heating medium 136 stored within a lower portion of the roller body 128. The other end 135b of the discharging pipe 135 is projected outward from the support member 130b.

Similarly to the discharging pipe 135, the other end 133d of the pipe body 133a in the introducing pipe 133 is projected outward from the support member 130a. Sealing devices 137 are respectively disposed at the other ends 133d and 135b of the pipe body 133a and the discharging pipe 135 projected outward from the respective support members 130a and 130b. The sealing devices 137 are disposed to seal the interiors of the support members 133a and 133b. The constructions of the sealing devices 137 on the introducing and discharging sides are equal to each other. Accordingly, the construction of the sealing device 137 on the introducing side in FIG. 16a will next be described.

The sealing device 137 has a packing holding ring 138 having a U-shape in cross section. The pipe body 133a extends through a central portion of the packing holding ring 138 and the packing holding ring 138 is fixed to this pipe body. This holding ring 138 has a recessed portion on a side thereof. An end portion of the support member 130a is fitted into the recessed portion of the holding ring 138. A large diameter portion 138a having a constant width is formed on an inner circumferential face of the holding ring 138 on an open side thereof. A gland packing 139 is disposed in the large diameter portion 138a. This gland packing 139 is pressed by a cylindrical pressing portion 141a axially projecting on a side of a pressing ring 141. The pressing ring 141 is fitted to an outer circumferential portion of the support member 130a and is supported by an internal bearing 140. The gland packing 139 hermetically comes in contact with an outer circumferential face of the support member 130a. A through bolt 142 is inserted into the holding ring 138 and is screwed into the pressing ring 141. The pressing ring 141 is moved onto the side of the holding ring 138 by fastening the through bolt 142 with respect to the pressing ring 138, thereby applying pressing force to the gland packing 139. A Teflon (PTFE) processing is performed with respect to a spacer ring 143. The spacer ring 143 is disposed between an end face of the rotating support member 130a and an opposite face of the holding ring 138 to prevent wearing caused by direct contact between the end face of the support member 130a and an inner wall of the fixed holding ring 138 in the side recessed portion thereof. A lug portion 144 is formed in an outer circumferential portion of the holding ring 138 and is projected outward in a diametrical direction of the holding ring. The lug portion 144 is attached to a stationary section such as an unillustrated casing.

In the accordance with the above pressure roller 116, the roller body 128 is rotated together with the support members 130a and 130b by the rotation of the sprocket 132. The pressurized air and the cooling or heating medium are fed from an unillustrated supply source therefor connected to an end portion of the pipe body of the introducing pipe 133. The pressurized air and the cooling or heating medium which are mixed with each other are ejected from the spraying nozzle port 133c and are blown against an inner circumferential face of the roller body 128, thereby cooling or heating the roller body 128.

The medium 136 blown against the inner circumferential face of the roller body 128 is sequentially stored within the lower portion of the roller body 128. The medium is then discharged by the pressure of a pressurized gas within the roller body 128 from the suction port 135a of the discharging pipe 135 to the exterior thereof using a siphon effect.

The medium introducing and discharging device explained with reference to FIGS. 11 and 11b can be also applied to the rotating cylindrical treatment apparatus in the second embodiment.

In FIG. 14, a pulverizer 145 is arranged in the vicinity of a lower portion of the drive roller 126 in which the endless belt 125 is separated from the circumferential surface or the cylindrical body 112 and is turned back. A receiving groove 146 is disposed under the pulverizer 145 and receives the treated material 114 pulverized by this pulverizer. A screw conveyer 147 is disposed in the receiving groove 146 to discharge the treated material 114 pulverized by the pulverizer to the exterior of the casing 111.

In FIG. 14, a scraper 148 scrapes off the treated material 114 being in close contact with the outer circumferential face of the cylindrical body 112 when the treated material 114 pressed and fed by the endless belt 125 on the outer circumferential face of the cylindrical body 112 is fed toward the pulverizer 145 outside a winding range of the endless belt 125.

The operation of the rotating cylindrical treatment apparatus 110 in the above-mentioned embodiment will next be described. In this case, the rotating cylindrical treatment apparatus 110 is assumed to be used as a cooler constituting a portion of the pulverizer in a manufacturing process of synthetic resin. Accordingly, the treated material processed by the rotating cylindrical treatment apparatus 110 means the synthetic resin in a melting state.

The cooling medium in the shape of liquid or gas is fed into the cylindrical body 112 and the pressure roller 116 from the cooling medium introducing port 113 and the spraying nozzle port 133c. The cooling medium is normally constructed by water, an aqueous solution of ethylene glycol, an aqueous solution of calcium chloride, FREON (CFC) gas, ammonia gas, etc. The outer circumferential faces on the roller body 128 of each of the cylindrical body 112 and the pressure roller 116 are cooled from the interiors thereof by the cooling medium. The molten resin 114 supplied from the feeding section 115 onto the circumferential face of the cylindrical body 112 is moved in accordance with the rotation of the cylindrical body 112. The molten resin 114 is then rolled by the pressure roller 116 through the endless belt 125 such that the molten resin is not irregularly cooled and has a uniform thickness. Thereafter, the molten resin 114 is supported by the endless belt 125 as it is and is fed in a state in which the molten resin 114 comes in close contact with the outer circumferential face of the cylindrical body 112. In the meantime, the molten resin 114 is cooled by the cylindrical body 112.

The resin 114 is thus discharged in a solid state from a winding range where the endless belt is wound around the cylindrical body 112. The solid resin 114 is then pulverized finely by the pulverizer 145 and is stored within the receiving groove 146. Thereafter, the pulverized resin within the receiving groove 146 is discharged outside the casing 111 by the rotation of the screw conveyer 147.

The endless belt 125 is preferably constructed by a Teflon (PTFE) belt to improve the separation of the resin 114 as the treated material from the endless belt 125. Namely, it is preferable to construct the endless belt 125 by the Teflon (PTFE) belt in which Teflon (PTFE) is laminated on a sheet-like material formed by e.g., glass fibers and the entire thickness of this belt is about 0.5 to 7 mm.

When a difference in speed between the endless belt 125 and the cylindrical body 112 is caused, the resin 114 as the treated material is shifted or broken. Accordingly, the operation of an unillustrated drive unit for driving the belt 125 through the drive roller 126 is controlled such that a moving speed of the belt 125 is synchronized with that of the resin 114 on the circumferential face of the cylindrical body 112.

In the above description, the rotating cylindrical treatment apparatus 110 is used in the manufacturing process of synthetic resin. However, the rotating cylindrical treatment apparatus 110 can be applied to a case in which ground fish and meat, etc. are heated. In this case, a suitable heating medium is supplied from the heating medium introducing port 113 and the spraying nozzle port 133c into the roller body 128 of each of the cylindrical body 112 and the pressure roller 116. This heating medium is constructed by warm water, vapor, Dowtherm oil, SK oil, mineral oil, silicon oil, molten salt, etc.

In the rotating cylindrical treatment apparatus in the second embodiment of the present invention, the treated material is supplied from the feeding section to a circumferential surface of the cylindrical body. The treated material is conveyed and rolled by the endless belt between the pressure roller and the cylindrical body such that the thickness of the treated material is uniform. Subsequently, the treated material is fed by the endless belt in a state in which the treated material comes in close contact with the circumferential face of the cylindrical body. In the meantime, the treated material is cooled or heated by the cylindrical body and the temperature of the treated material is finally set to a predetermined temperature.

As mentioned above, in accordance with the rotating cylindrical treatment apparatus in the present invention, the endless belt is disposed to cool or heat the treated material by the cylindrical body and is also wound around the pressure roller for providing a uniform thickness of the treated material. Accordingly, the uniform thickness of the treated material is obtained by the pressing force of the pressure roller through the endless belt and the operation of a device for adjusting the distance between the pressure roller and the cylindrical body. Further, a processing with respect to the treated material is performed reliably and rapidly through the endless belt without directly winding the treated material around the pressure roller.

Figure 17:
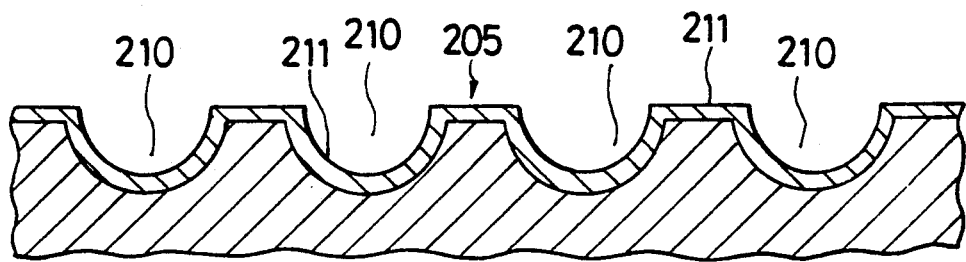
FIG. 17 is a partially enlarged cross-sectional view of a pressure roller in a rotating cylindrical treatment apparatus in a third embodiment of the present invention.

FIG. 17 is an enlarged cross-sectional view of a pressure roller in a rotating cylindrical treatment apparatus in a third embodiment of the present invention. In this third embodiment, the entire construction of the rotating cylindrical treatment apparatus is similar to that of the general rotating cylindrical treatment apparatus shown in FIG. 1 and the detailed description thereof is therefore omitted in the following description.

In the rotating cylindrical treatment apparatus in the third embodiment, the construction of a pressure roller 205 is different from that in the general rotating cylindrical treatment apparatus. Namely, as shown in FIG. 17 enlarging the pressure roller 205, an infinite number of fine hemispherical recessed portions 210 are formed on a surface of the pressure roller 205. The surface of the pressure roller 205 including the recessed portions 210 is plated with hard chrome. In FIG. 17, reference numeral 211 designates a plated layer.

The fine recessed portions 210 can be formed in various kinds of manufacturing methods. In a most preferable method, glass bead No. 40 having a size passing through a 40-wire mesh is blown against a ground surface of the pressure roller 205 by shotblast. A metallic ball such as a bearing, sand, etc. may be used instead of this glass bead. Thereafter, the surface of the pressure roller 205 having the recessed portions 210 thereon is plated with hard chrome. A blasting material about Nos. 20 to 80 may be used. It is effective that the surface of the pressure roller has an average roughness (Ra) about 5 to 7 $\mu$m on a central line thereof prescribed by Japanese standard JIS B 0601 and a maximal height (Rmax) of this surface is about 40 to 60 $\mu$m.

In accordance with such a pressure roller 205, the recessed portions 210 are closed by the treated material 204 when the treated material 204 is pressed by the pressure roller 205 having the recessed portions 210 and comes in close contact with the pressure roller 205 at a rolling time of the treated material. In this case, air is stored within the recessed portions 210 so that an infinite number of air layers are formed between the treated material 204 and the recessed portions 210 without obstructing a rolling operation with respect to the treated material. As a result, the treated material discharged from the pressure roller 205 is more sticky with respect to the cylindrical body 201 in comparison with the pressure roller 205. Namely, tack strength between the treated material and the cylindrical body 201 is stronger than that between the treated material and the pressure roller 205. Therefore, the treated material is rapidly separated from the pressure roller 205 and is fed while the treated material comes in close contact with the cylindrical body 201 and is supported by the endless belt 206. Accordingly, no treated material 204 discharged from the pressure roller 205 is raised from the cylindrical body so that it is possible to prevent the above-mentioned problems with respect to such raise from being caused in the rotating cylindrical treatment apparatus.

In the above embodiment, the shape of the recessed portions 210 is hemispherical, but is not limited to such a shape. Further, similarly to the cylindrical body 201, the pressure roller 205 may have a cooling or heating mechanism therein.

In the rotating cylindrical treatment apparatus in the third embodiment of the present invention, the treated material is supplied onto a circumferential face of the cylindrical body from the feeding section. The treated material is then rolled between the pressure roller and the cylindrical body such that the thickness of the treated material is constant. In this case, the treated material in close contact with the pressure roller is rapidly separated from the pressure roller by air within a number of fine recessed portions formed on a surface of the pressure roller. The treated material then comes in close contact with the cylindrical body and is conveyed by the endless belt as it is. In the meantime, the treated material is cooled or heated on the circumferential face of the cylindrical body and the temperature of the treated material is finally set to a predetermined temperature.

As mentioned above, in accordance with the rotating cylindrical treatment apparatus in the third embodiment of the present invention, the fine recessed portions are formed on a surface of the pressure roller so that it is possible to prevent a raise in the treated material rolled and discharged from the pressure roller, thereby stably rolling the treated material.

Figure 18:
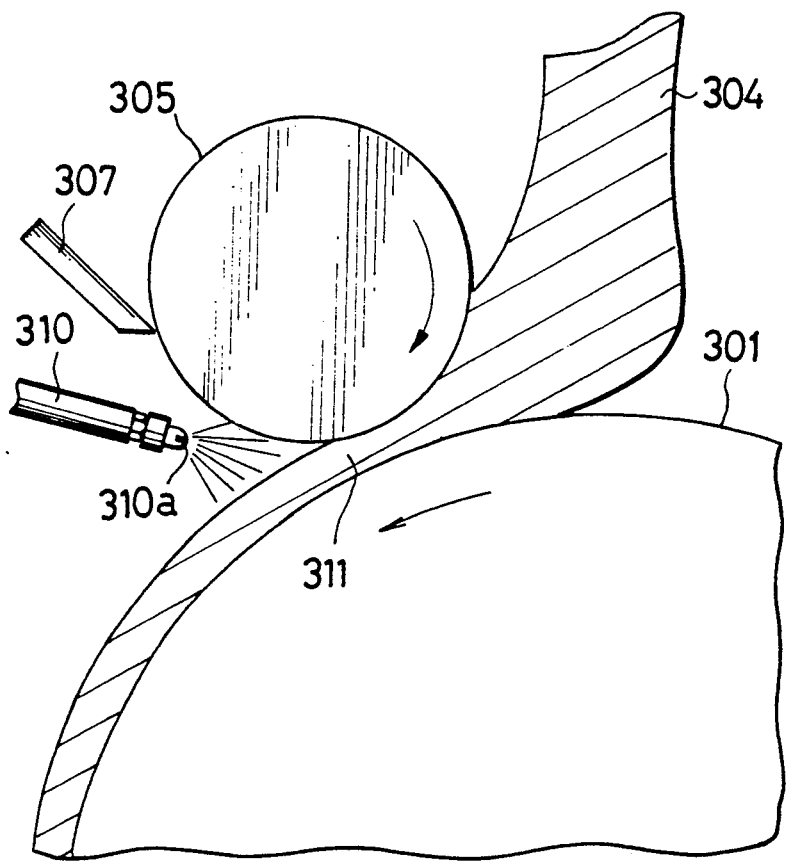
FIG. 18 is an enlarged cross-sectional view showing the construction of a peripheral portion of a pressure roller in a rotating cylindrical treatment apparatus in a fourth embodiment of the present invention.

FIG. 18 is a partially enlarged explanatory view showing the constructions of a pressure roller and a peripheral portion thereof in a rotating cylindrical treatment apparatus in a fourth embodiment of the present invention. The other constructions are similar to those in the general rotating cylindrical treatment apparatus shown in FIG. 1.

In the rotating cylindrical treatment apparatus in the fourth embodiment, as shown in FIG. 18, air nozzles 310 are arranged in the vicinity of a pressure roller 305 on a rolling outlet side such that a spraying port 310a of each of the air nozzles 310 is directed toward a clearance portion 311 between a cylindrical body 301 and the pressure roller 305. The air nozzles 310 are connected to an unillustrated source for supplying pressurized air. Since the pressure roller 305 has a certain axial length, a suitable number of air nozzles 310 are arranged along a longitudinal direction of the pressure roller 305. These air nozzles 310 may be individually connected to the pressurized air supply source through hoses. Otherwise, an unillustrated single pipe connected to the pressurized air supply source may be fixedly arranged along the pressure roller 305 and the respective air nozzles 310 may be attached to this single pipe every a predetermined distance. The air nozzles 310 can be constructed by nozzles of various kinds of types and are preferably constructed by a nozzle providing a sector spraying range in which a spraying angle is 90° and an air pressure is 3 kg/cm$^2$.

In the rotating cylindrical treatment apparatus in the above fourth embodiment, the treated material 304 is supplied onto a circumferential face of the cylindrical body 301. This treated material 304 is then fed into the clearance portion 311 between the pressure roller 305 and the cylindrical body 301. Thus, the treated material 304 is rolled such that the thickness of the treated material is constant. In this case, the treated material 304 pressed against the circumferential face of the cylindrical body 301 by the pressure roller 305 is moved very delicately immediately after the treated material has been rolled. Namely, the treated material 304 intermittently tries to slightly move upward from the circumferential face of the cylindrical body 301 and be wound around the pressure roller 305. However, such a movement of the treated material 304 is restricted by air supplied from the air nozzles 310. As a result, the treated material 304 is not wound around the pressure roller 305, but is separated from the pressure roller 305 and comes in close contact with the cylindrical body 301. Thus, it is possible to prevent the treated material 304 from being wound around the pressure roller 305. A small amount of the treated material 304 attached to the pressure roller 305 is removed therefrom by the scraper 307 as in the general rotating cylindrical treatment apparatus. The treated material 304 in close contact with the cylindrical body 301 is fed as it is while the treated material 304 is supported by an endless belt 306. In the meantime, the treated material 304 is cooled or heated on the circumferential face of the cylindrical body 301. Thus, the temperature of the treated material 304 is finally set to a predetermined temperature.

When the pressure roller 305 has recessed portions as shown in FIG. 17, the treated material discharged from the pressure roller 305 is more sticky with respect to the cylindrical body 301 in comparison with the pressure roller 305. Namely, sticky force between the treated material and the cylindrical body 301 is stronger than that between the treated material and the pressure roller 305. Further, as mentioned above, the treated material 304 is continuously pressed against the circumferential face of the cylindrical body 301 by the air supplied from the air nozzles 310. Therefore, the treated material is rapidly separated from the pressure roller 305 and is moved while the treated material comes in close contact with the cylindrical body 301 and is supported by the endless belt 306.

The air blown out of the air nozzles can be constructed by cooled air to improve cooling efficiency.

In the rotating cylindrical treatment apparatus in the fourth embodiment of the present invention, the treated material is supplied onto a circumferential face of the cylindrical body from the feeding section. The treated material is fed to a clearance portion between the pressure roller and the cylindrical body and is then rolled such that the thickness of the treated material is constant. In this case, the treated material in close contact with the pressure roller tries to be wound around a circumferential surface of the pressure roller. However, force for separating the treated material from the pressure roller is applied to the treated material by air sprayed from air nozzles. Thus, the treated material is rapidly separated from the pressure roller and comes in close contact with the cylindrical body. The treated material is then conveyed by the endless belt as it is. In the meantime, the treated material is cooled or heated on the circumferential face of the cylindrical body and the temperature of the treated material is finally set to a predetermined temperature.

As mentioned above, in the rotating cylindrical treatment apparatus in the fourth embodiment of the present invention, the air nozzles are arranged on an outlet side of the treated material rolled by the pressure roller. Therefore, it is possible to prevent the treated material rolled and discharged from the pressure roller from being raised from the cylindrical body by the air ejected from the air nozzles. As a result, a stable rolling operation can be performed without winding the treated material around the pressure roller.

Figure 19:
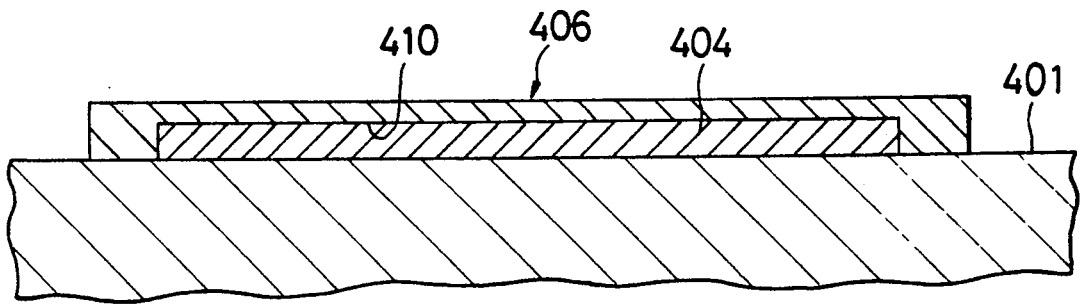
FIG. 19 is a cross-sectional view showing a portion of an endless belt in a rotating cylindrical treatment apparatus in a fifth embodiment of the present invention.

FIG. 19 is a cross-sectional view showing a portion of an endless belt in a rotating cylindrical treatment apparatus in a fifth embodiment of the present invention. The entire construction of the rotating cylindrical treatment apparatus in this embodiment is similar to that in the general rotating cylindrical treatment apparatus shown in FIG. 1 and a detailed explanation thereof is therefore omitted in the following description.

In the rotating cylindrical treatment apparatus in the fifth embodiment of the present invention, the construction of an endless belt 406 is different from that in the general rotating cylindrical treatment apparatus. Namely, as illustrated in FIG. 19 partially showing the endless belt 406, a recessed groove 410 has a U-shape in cross section and is formed on a surface of the endless belt 406 on which a treated material comes in close contact with a circumferential face of a cylindrical body 401.

Since the recessed groove 410 is formed on the surface of the endless belt 406, the treated material 404 rolled by a pressure roller 405 at an approximately constant thickness is fed into the recessed groove 410 when the treated material is supported between the endless belt 406 and the cylindrical body 401. Thus, the treated material 404 comes in press contact with the circumferential face of the cylindrical body 401 and is fed and heated or cooled in this press contact state. Accordingly, when the treated material 404 is pressed against the cylindrical body 401 by the endless belt 406, a sectional shape of the treated material 404 is in conformity with that of the recessed groove 410. As a result, when the depth of the recessed groove 410 is constantly formed in a width direction of the belt, the thickness of the treated material 404 is uniformed in the width direction of the belt.

Figure 20:
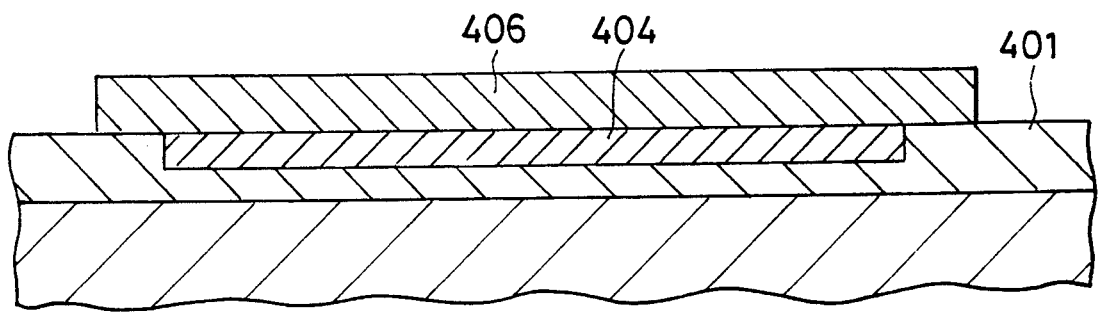
FIG. 20 is a cross-sectional view showing portions of an endless belt and a cylindrical body in a rotating cylindrical treatment apparatus in a sixth embodiment of the present invention.
Figure 21:
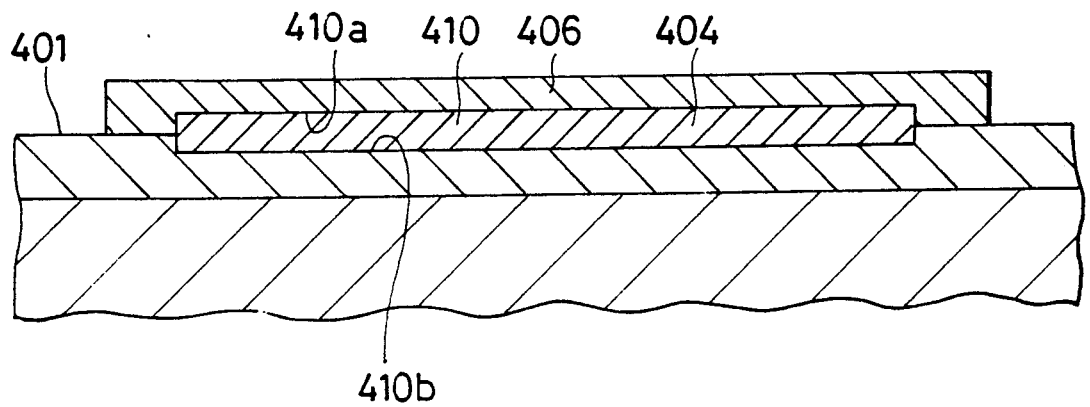
FIG. 21 is a cross-sectional view showing portions of an endless belt and a cylindrical body in a rotating cylindrical treatment apparatus in a seventh embodiment of the present invention.
Figure 22:
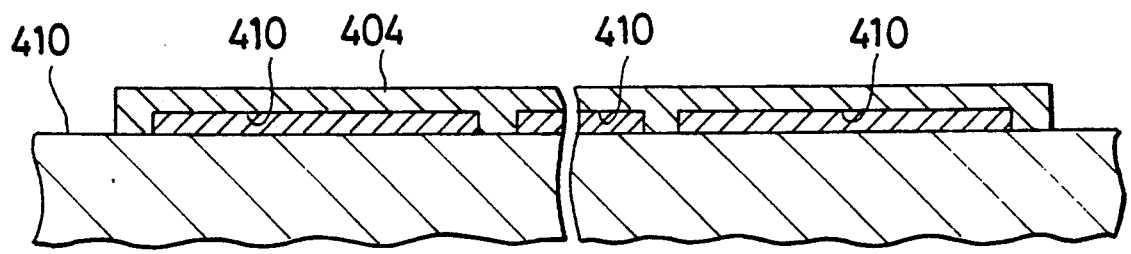
FIG. 22 is a cross-sectional view showing portions of an endless belt and a cylindrical body in a rotating cylindrical treatment apparatus in an eighth embodiment of the present invention.

In the above fifth embodiment, the recessed groove 410 is formed on the endless belt 406, but may be formed on the circumferential face of the cylindrical body 401 as shown in FIG. 20. Further, as shown in FIG. 21, recessed grooves 410a and 410b may be respectively formed on surfaces of the endless belt 406 and the cylindrical body 401. In this case, when the endless belt 406 and the cylindrical body 401 come in close contact with each other, the recessed grooves 410a and 410b are aligned with each other to form one recessed groove 410. In a large-sized rotating cylindrical treatment apparatus, the width of the sheet-like endless belt 406 is increased in accordance with the increase in size of the cylindrical body 401. Therefore, when only a single recessed groove is disposed in such a case, the width of the recessed groove is excessively large so that the thickness of the treated material in a central portion thereof in the width direction of the belt is increased in comparison with that at both ends of the belt as in the general rotating cylindrical treatment apparatus. Therefore, in such a case, a plurality of recessed grooves 410 are formed as shown in FIG. 22. The plurality of recessed grooves 410 can be formed in one or both of the endless belt 406 and the cylindrical body 401.

In the rotating cylindrical treatment apparatuses in the fifth to eighth embodiments of the present invention, the treated material is supplied onto a circumferential face of the cylindrical body from the feeding section. The treated material is fed between the pressure roller and the cylindrical body and is then rolled such that the thickness of the treated material is constant. The treated material is then conveyed by the endless belt. In this case, the rolled treated material is fed into a groove formed in one or both of the endless belt and the cylindrical body so that the thickness of the treated material in the width direction thereof is uniformly held. The treated material is cooled or heated on the circumferential face of the cylindrical body while the treated material is conveyed. Thus, the temperature of the treated material is finally set to a predetermined temperature.

Figure 23:
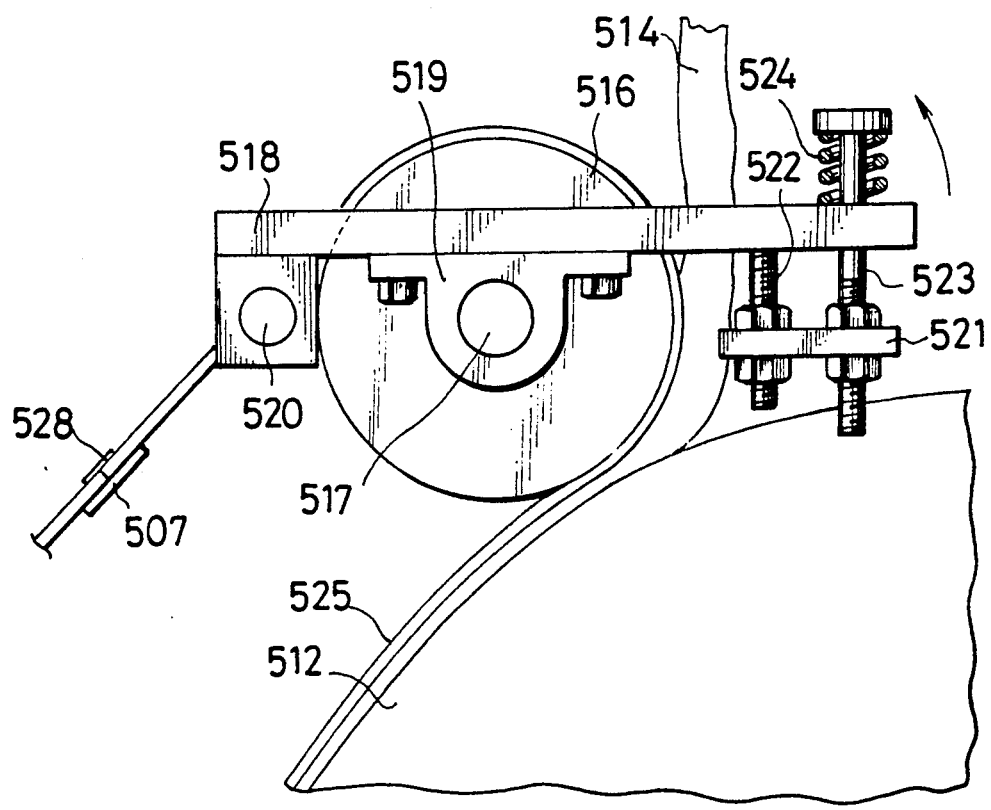
FIG. 23 is an explanatory view schematically showing the construction of a device for adjusting the distance between a pressure roller and a cylindrical body in a rotating cylindrical treatment apparatus in a ninth embodiment of the present invention.
Figure 24:
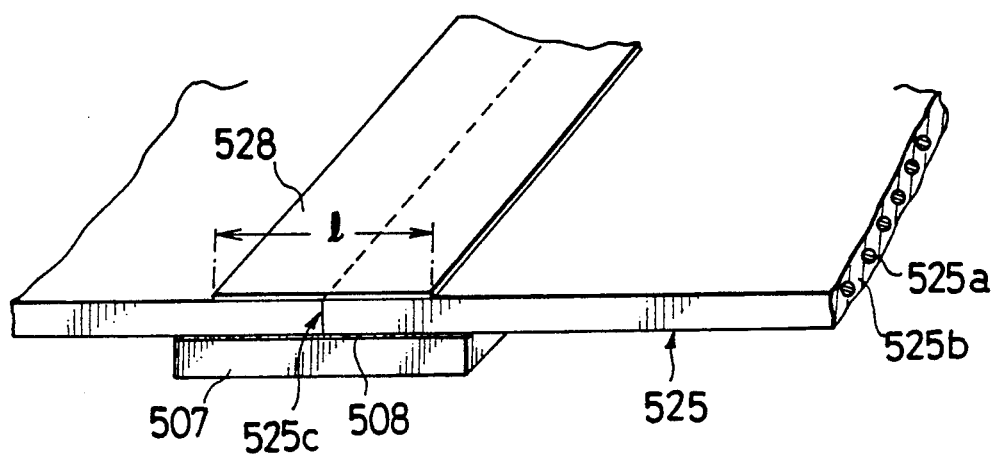
FIG. 24 is a perspective view showing joining portions of an endless belt used in the ninth embodiment shown in FIG. 23.

FIG. 23 is an explanatory view schematically showing the construction of a device for adjusting the distance between a pressure roller 516 and a cylindrical body 512 in a rotating cylindrical treatment apparatus in a ninth embodiment of the present invention. FIG. 24 is a perspective view showing joining portions of an endless belt 525 used in the ninth embodiment shown in FIG. 23.

As shown in FIG. 24, with respect to the endless belt 525, a sheet-like material formed by glass fibers 525a is coated with fluororesin 525b to form a single belt having an entire thickness about 0.5 to 7 mm. Both ends of the single belt are joined to each other such that a reinforcing plate 507 made of the same material as the single belt 525 is arranged between joining portions 525c of the single belt on a rear face thereof which does not come in contact with a treated material 514. The reinforcing plate 507 is adhered to the joining portions 525c of the single belt by an adhesive 508. Further, a thin sheet 528 made of fluororesin is adhered by an adhesive onto front surfaces of the joining portions 525c of the single belt 525. As shown in FIG. 24, the thickness of this thin sheet 528 is preferably set to about 0.125 mm and the length 1 of this thin sheet along a longitudinal direction of the belt 525 is preferably set to about 15 to 25 mm.

The endless belt 525 is covered with the thin sheet 528 made of fluororesin in the joining portions of the endless belt joined to each other. Accordingly, the feathery glass fibers 525a exposed onto surfaces of the joining portions 525c are covered with the sheet 528 made of fluororesin. Therefore, the feathery glass fibers 525a do not come in contact with the treated material 514, so that no treated material 514 is attached to the feathery glass fibers 525a.

In the rotating cylindrical treatment apparatus in the ninth embodiment of the present invention, the treated material is supplied onto a circumferential face of the cylindrical body from the feeding section. The treated material is fed by the endless belt between the pressure roller and the cylindrical body and is then rolled such that the thickness of the treated material is constant. Subsequently, the treated material is fed by the endless belt in a state in which the treated material comes in close contact with the outer circumferential face of the cylindrical body. In the meantime, the treated material is cooled or heated by the cylindrical body and the temperature of the treated material is finally set to a predetermined temperature.

The endless belt is formed by joining both ends of a single belt including glass fibers to each other. A thin sheet made of fluororesin is fixed to the joining portions of the endless belt such that this sheet is arranged between these joining portions on surfaces thereof in contact with the treated material. Accordingly, the feathery glass fibers exposed onto front surfaces of the joining portions are covered with this fluororesin sheet so that no feathery glass fibers directly come in contact with the treated material. Further, the sheet for covering the feathery glass fibers is formed to be very thin. Accordingly, the thickness of a portion of the treated material rolled by the pressure roller at a constant thickness and located between the endless belt and the cylindrical body is not greatly changed by this thin sheet in the position thereof. Thus, it is possible to provide the treated material cooled or heated by the cylindrical body and having an approximately uniform thickness.

Figure 25:
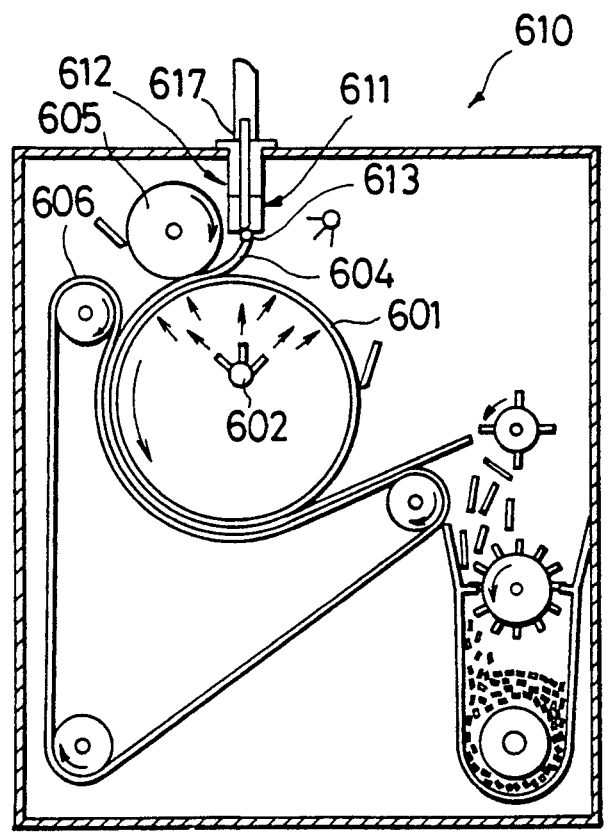
FIG. 25 is a cross-sectional view schematically showing a rotating cylindrical treatment apparatus in a tenth embodiment of the present invention.

FIG. 25 shows a rotating cylindrical treatment apparatus 610 in a tenth embodiment of the present invention.

The construction of this rotating cylindrical treatment apparatus 610 is similar to that of the general rotating cylindrical treatment apparatus shown in FIG. 1 except for a feeding section 611. Therefore, the explanation about the construction of the treatment apparatus 610 except for the feeding section 611 will be omitted in the following description.

In the rotating cylindrical treatment apparatus 610 in this embodiment, as shown in FIG. 26, the feeding section 611 is constructed by a nozzle portion 612 connected to a source for supplying a treated material. The nozzle portion 612 has a triangular shape in cross section and has an opening 613 extending in an axial direction of a cylindrical body 601, i.e., a width direction thereof. The nozzle portion 612 is formed to be thin in a radial direction of the cylindrical body 601. Accordingly, as shown in FIG. 27, the opening 613 is formed in a rectangular shape extending in the axial direction of the cylindrical body 601. When the width of the opening 613 is set to 1 and the width of the cylindrical body 601 is set to L, a ratio l/L is set to 0.3 to 0.8. Namely, the width of the opening 613 is set to about 30 to 80 percent of the width of the cylindrical body 601. As clearly shown in FIGS. 26 and 27, a thin reinforcing rib 614 is arranged in a central portion of the opening 613. This reinforcing rib 614 is disposed to prevent the nozzle portion 612, especially, the opening 613 from being expanded and deformed when a viscous treated material such as molten resin is pressurized and pushed out. Such a thin reinforcing rib 614 can be neglected with respect to a size of the width of the opening 613 even when a plurality of thin reinforcing ribs are disposed.

An outer wall of the nozzle portion 612 has a double structure as shown in FIG. 26. The interior of this double structure is constructed by a jacket 615 for feeding a cooling or heating medium. This jacket 615 is communicated with an introducing pipe 616 connected to an upper portion of the nozzle portion 612 to introduce the cooling or heating medium. The jacket 615 is also communicated with a discharging pipe 617 connected to a lower portion of the nozzle portion 612 to discharge the cooling or heating medium. The cooling or heating medium is constructed by vapor, heat transfer oil, etc. when the treated material 604 is heated. The cooling or heating medium is constructed by water, etc. when the treated material 604 is cooled.

In the above rotating cylindrical treatment apparatus 610 in the tenth embodiment, the treated material 604 fed from the treated material supply source is supplied from the opening 613 of the nozzle portion 612 constituting the feeding section onto the cylindrical body 601. The length of the opening 613 of the nozzle portion 612 along the width direction of the cylindrical body is set to about 30 to 80 percent of the width of the cylindrical body. Accordingly, the treated material 604 is supplied at once from the feeding section 611 in a width range of the 30 to 80 percent of the width of the cylindrical body 601. Thereafter, the treated material 604 spreads in a width range of the remaining 20 to 70 percent of the width of the cylindrical body 601. Namely, the treated material 604 spreads in a width range of 10 to 35 percent of the width of the cylindrical body on one side thereof. Thus, the treated material is rolled by the pressure roller 605 such that the thickness of the treated material is a predetermined thickness.

In the rotating cylindrical treatment apparatus 610 in this embodiment, the nozzle portion 612 constituting the feeding section 611 is provided with the jacket 615 for feeding the cooling or heating medium. The treated material 604 is cooled or heated until just before the treated material is discharged from the opening 613 of the nozzle portion 612. Therefore, it is possible to discharge the treated material from the nozzle portion 612 without reducing the original fluidity of the treated material 604.

As mentioned above, in the rotating cylindrical treatment apparatus in the tenth embodiment of the present invention, the opening of the nozzle portion is extended such that the width of the opening is set to about 30 to 80 percent of the width of the cylindrical body in the axial direction thereof. Accordingly, it is possible to supply the treated material onto the circumferential face of the cylindrical body in a predetermined spreading range even when the fluidity of the treated material is low or the cylindrical body is large-sized. As a result, it is possible to roll the treated material at predetermined thickness and width.

Many widely different embodiments of the present invention may be constructed without departing from the spirit and scope of the present invention. It should be understood that the present invention is not limited to the specific embodiments described in the specification, except as defined in the appended claims.

What is claimed is:

1. A rotating cylindrical treatment apparatus, comprising:
   a cylindrical body rotatably supported in said treatment apparatus;
   a feeding section arranged adjacently to said cylindrical body for supplying a treated material onto an outer circumferential surface of said cylindrical body;
   a pressure roller arranged adjacently to said cylindrical body and said feeding section for pressing said supplied treated material against said outer circumferential surface and for rolling said pressed treated material;
   a first medium introducing device disposed in said cylindrical body for introducing a heating or cooling medium into said cylindrical body and for discharging said introduced medium from said cylindrical body;

a second medium introducing device attached to said pressure roller for introducing said medium into said pressure roller and for discharging said introduced medium from said pressure roller; and an endless belt partially wound along said outer circumferential surface of said cylindrical body for conveying said rolled treated material while causing said rolled treated material to be closely contacted with said outer circumferential surface, said pressure roller comprising: a hollow roller body having two end faces; a tubular support member attached at one end thereof to one of said end faces of said roller body coaxially with said roller body; another tubular support member attached at one end thereof to the other of said end faces coaxially with said roller body, said tubular support member and said another support member being opened at said one ends thereof toward an interior of said roller body, said second medium introducing device comprising: an introducing pipe disposed within said tubular support member for introducing said medium into said roller body through said introducing pipe, and projected outward from the other end of said tubular support member at one end of said introducing pipe, said introducing pipe having at said one end thereof an inlet port for said medium; a spraying nozzle pipe attached to the other end of said introducing pipe at one end of said nozzle pipe such that said spraying nozzle pipe is projected at the other end thereof from said one end of said tubular support member into said interior of said roller body, said spraying nozzle pipe having a spraying port in an end face of the other end thereof, said spraying port being formed so as to spray said medium into said interior of said roller body at a spraying angle of an obtuse angle around a central axis of said roller body; a discharging pipe disposed within said another tubular support member and provided with a suction port at one end thereof, said discharging pipe being projected outward from the other end of said another tubular support member at the other end of said discharging pipe and immersed at said one end thereof in a cooling or heating medium stored within a lower portion of said roller body, said discharging pipe having at the other end thereof an outlet port; and two sealing means respectively disposed at the other ends of said tubular support member and said another tubular support member for sealing respective interiors of said tubular support member and said another support member.

2. A rotating cylindrical treatment apparatus according to claim 1, in which said first medium introducing device comprises: a pipe body penetrating through both end faces of said cylindrical body coaxially with said cylindrical body, and having at one end thereof an inlet port for said medium and having at the other end thereof an outlet port; a partitioning member disposed in said pipe body situated in said cylindrical body in such a manner as to divide said situated pipe body into an introducing pipe section and a discharging pipe section; a spraying means connected to said introducing pipe section for spraying said medium introduced from said inlet port into an interior of said cylindrical body; and a suction pipe disposed at said discharging pipe section for discharging said sprayed medium to an outside of said cylindrical body through said outlet port.

3. A rotating cylindrical treatment apparatus according to claim 1 or 2, which further comprises air nozzles arranged in the vicinity of said pressure roller on the side where said rolled treated material is discharged from a clearance portion between said cylindrical body and said pressure roller, a spraying port of each of said air nozzles being directed toward said clearance portion.

4. A rotating cylindrical treatment apparatus according to claim 1 or 2, which further comprises a pressing force adjusting device for adjusting a pressing force of said pressure roller with respect to said treated material.

5. A rotating cylindrical treatment apparatus according to claim 1 or 2, in which said endless belt is wound around a first guide roller disposed adjacently to said pressure roller, a drive roller arranged on an opposite side of said cylindrical body from said first guide roller, and a second guide roller arranged on an opposite side of said cylindrical body from said pressure roller, a portion of said endless belt extending between said drive roller and said first guide roller being partially wound on said outer circumferential surface of said cylindrical body.

6. A rotating cylindrical treatment apparatus according to claim 1 or 2, in which said endless belt is wound around said pressure roller, a first guide roller is disposed adjacently to said pressure roller, a drive roller is arranged on an opposite side of said cylindrical body from said first guide roller, and a second guide roller is arranged on an opposite side of said cylindrical body from said pressure roller, a portion of said endless belt extending between said drive roller and said pressure roller being partially wound on said outer circumferential surface of said cylindrical body.

7. A rotating cylindrical treatment apparatus according to claim 1 or 2, in which said pressure roller is provided with a large number of fine hemispherical recessed portions formed on an outer circumferential surface of said pressure roller.

8. A rotating cylindrical treatment apparatus according to claim 4, in which said pressing force adjusting device comprises a pair of bearings supporting said pressure roller, an arm pivotally attached at one end thereof to a frame of said apparatus and supporting said pair of bearings at a middle portion of said arm, a stopper disposed on said frame for stopping the other end of said arm such that said pressure roller is positioned away from said cylindrical body, an adjusting means attached to said frame for adjusting a position of said stopper, and an urging means attached to said frame for urging said other end of said arm toward said stopper.

9. A rotating cylindrical treatment apparatus according to claim 1 or 2, in which said feeding section comprises a nozzle portion disposed along an axial direction of said cylindrical body and having an opening extending along said axial direction, said opening being so formed that a ratio of a length thereof to an axial length of said cylindrical body is within a range of 0.3 to 0.8.

10. A rotating cylindrical treatment apparatus according to claim 5, in which a recessed groove having a U-shape in cross section is formed on any one of said outer circumferential surface of said cylindrical body and one surface of said endless belt so as to make a thickness of said treated material rolled by said pressure roller substantially constant, said one surface of said endless belt coming in contact with said outer circumferential surface of said cylindrical body.

11. A rotating cylindrical treatment apparatus according to claim 6, in which said endless belt comprises: a belt formed into a ring shape by joining both ends of a single belt composed of a sheet-like material woven from glass fibers and of fluororesin laminated onto said sheet-like material; a reinforcing plate adhered between joining portions of said single belt on a rear surface of said formed belt which rear surface does not come in contact with said treated material; and a thin sheet made of fluororesin and adhered onto front surfaces of said joining portions of said single belt, said front surfaces coming in contact with said treated material.

12. A rotating cylindrical treatment apparatus according to claim 8, in which said pressure roller is provided with a large number of fine hemispherical recessed portions formed on an outer circumferential surface of said pressure roller.

13. A rotating cylindrical treatment apparatus according to claim 9, in which said nozzle portion comprises a jacket disposed on a periphery of said nozzle portion so as to flow a heating medium into said jacket.

* * * * *